United States Patent
Tsuji

(10) Patent No.: US 7,480,779 B2
(45) Date of Patent: Jan. 20, 2009

(54) STORAGE SYSTEM, DATA RESTORING METHOD, AND DATA ACCESS METHOD

(75) Inventor: Hironori Tsuji, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 547 days.

(21) Appl. No.: 11/258,912

(22) Filed: Oct. 27, 2005

(65) Prior Publication Data

US 2007/0043773 A1  Feb. 22, 2007

(30) Foreign Application Priority Data

Aug. 22, 2005  (JP) ............................. 2005-240140

(51) Int. Cl.
*G06F 12/00* (2006.01)
(52) U.S. Cl. .................... 711/162; 711/163; 707/200
(58) Field of Classification Search ................ 711/162, 711/163; 707/200
See application file for complete search history.

(56) References Cited

U.S. PATENT DOCUMENTS 7,353,351 B1 * 4/2008 Haase et al. ................ 711/162

| | | | |
|---|---|---|---|
| 2004/0073831 A1 * | 4/2004 | Yanai et al. | 714/7 |
| 2004/0186858 A1 | 9/2004 | McGovern et al. | |
| 2005/0097260 A1 * | 5/2005 | McGovern et al. | 711/100 |
| 2005/0235095 A1 * | 10/2005 | Winarski et al. | 711/4 |
| 2006/0112251 A1 * | 5/2006 | Karr et al. | 711/170 |

* cited by examiner

*Primary Examiner*—Kevin L Ellis
*Assistant Examiner*—Hashem Farrokh
(74) *Attorney, Agent, or Firm*—Mattingly, Stanger, Malur & Brundidge, P.C.

(57) ABSTRACT

This invention provides a storage system in which a volume containing WORM data is restorable. A control unit, after the copying is finished, consults a first meta data associated with data stored in a first block of the first volume, consults, in a case where the consulted first meta data including information indicating that the data stored in the first block of the first volume is prohibited from being updated for a given period, a meta data for a block that follows the first block of the first volume, and restores, in a case where the consulted first meta data does not includes information indicating that the data stored in the first block of the first volume is prohibited from being updated for a given period, data stored in the second volume into the first volume by copying data stored in a second block, which is associated with the first block of the volume, and is located in the second volume, to the first block of the first volume, thereby reproducing the data of the second volume in the first volume for restoration.

14 Claims, 32 Drawing Sheets

MODE PARAMETER FORM FOR WORM CONTROL 502

I/O FORM FOR VOLUME REPLICATION CONTROL 601

MODE PARAMETER FORM FOR VOLUME REPLICATION CONTROL 602

WORM MANAGEMENT INFORMATION ENTRY 20233

WORM BLOCK INFORMATION ENTRY 20234

VOLUME PAIR MANAGEMENT INFORMATION ENTRY 20223

VOLUME PAIR MANAGEMENT INFORMATION ENTRY 30223

STORAGE SYSTEM, DATA RESTORING METHOD, AND DATA ACCESS METHOD

CLAIM OF PRIORITY

The present application claims priority from Japanese application P2005-240140 filed on Aug. 22, 2005, the content of which is hereby incorporated by reference into this application.

BACKGROUND

This invention relates to a storage system, and more specifically to a storage system in which a volume containing WORM data is restorable.

Conventional long-term file keeping systems include a storage system as disclosed in, for example, US 2004/0185868, which has a-write once read many (WORM) function to set a file unchangeable and undeletable for the duration of a retention period.

With the WORM function, a time limit or a period is set individually for each WORM file stored in the storage system, and the WORM file cannot be changed or deleted until the set time limit or period expires.

SUMMARY OF THE INVENTION

A volume pair function in a storage system will be described first.

In a storage system, a method of duplicating data by copying data in a volume set in a disk drive to another volume is generally used for the purpose of avoiding a data failure in the disk drive. This method is called volume replication or volume image copy.

In copying a volume that contains a WORM file, WORM attributes are also copied, to thereby enhance the reliability of the volume.

In such a volume, a WORM file in the volume is protected against data alteration, but the volume may experience a sector failure and a failure caused by some contradictions in the file system. Recovery from such failures is made in general by restoring data from a secondary volume, which holds a copy of a primary volume. However, when there is a WORM file in the volume, data of the WORM file cannot be updated, and therefore an attempt to restore the volume fails.

This invention has been made in view of the above-mentioned problem, and it is therefore an object of this invention to provide a storage system in which a volume containing a WORM file is restorable.

According to an example of an embodiment of this invention, there is provided a storage system comprising a disk drive for storing data and a control unit connected to the disk drive for controlling data read/write from/to volumes set in the disk drive, wherein the control unit comprises a processor and a memory, the memory storing a program for controlling data read/write from/to the volumes and a program for controlling copying and restoring between the volumes, wherein the volumes include a first volume and a second volume, the first volume storing data that can be copied to the second volume, and wherein, after the copying is finished, the control unit consults a first meta data associated with data stored in a first block of the first volume, consults, in a case where the consulted first meta data including information indicating that the data stored in the first block of the first volume is prohibited from being updated for a given period, a meta data for a block that follows the first block of the first volume, and restores, in a case where the consulted first meta data does not include information indicating that the data stored in the first block of the first volume is prohibited from being updated for a given period, data stored in the second volume into the first volume by copying data stored in a second block, which is associated with the first block of the volume, and is located in the second volume, to the first block of the first volume.

This invention makes it possible to recover data stored in a volume that forms a copy pair with another volume and contains WORM data (i.e., data prohibited from being updated for a given period) even when a failure occurs in the volume.

BRIEF DESCRIPTION

DETAILED DESCRIPTION OF THE PREFERRED EMBODIMENTS

Embodiments of this invention will be described below with reference to the accompanying drawings.

Figure 1:
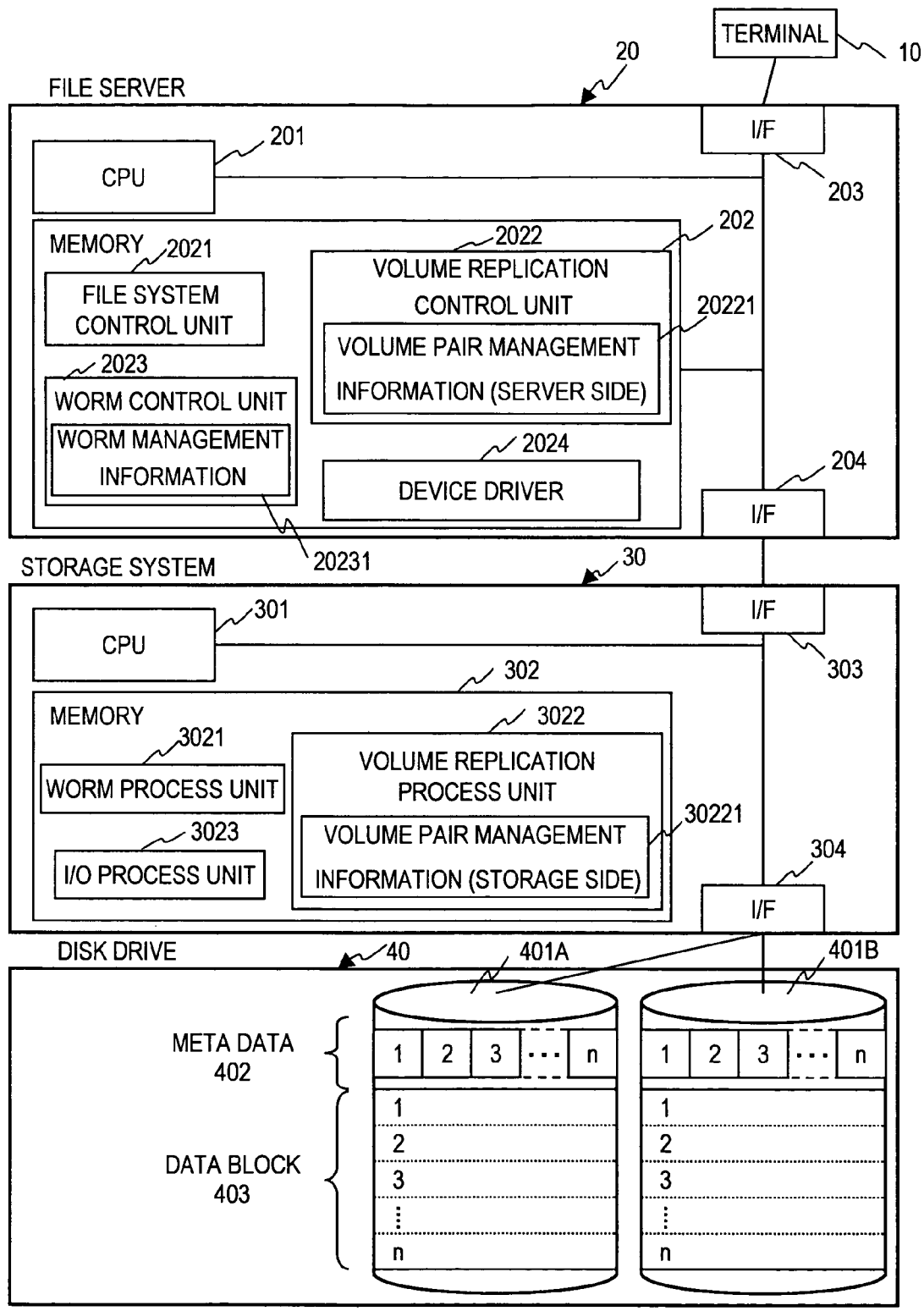
FIG. 1 is a block diagram of a configuration of a storage system according to a first embodiment of this invention.

FIG. 1 is a block diagram of a configuration of a storage system according to a first embodiment of this invention.

A file server 20 and a storage system 30 are connected to each other via a network.

A terminal 10 is connected to the file server 20. A disk drive 40 is connected to the storage system 30.

The terminal 10 has a user application, which performs processing to send a request to the file server 20 and to receive a result of the request.

Receiving a request from the terminal 10, the file server 20 requests the storage system 30 to input/output data in a volume of the disk drive 40.

The storage system 30 executes data I/O in the disk drive 40. The storage system 30 also manages a configuration of the disk drive 40.

The file server 20 has a CPU 201, a memory 202, and interfaces (I/Fs) 203 and 204.

The CPU 201 executes a program stored in the memory 202 to execute processing prescribed in the program.

The memory 202 stores various programs and information. Specifically, a file system control unit 2021, a volume replication control unit 2022, a WORM control unit 2023, and a device driver 2024 are stored in the memory 202. The CPU 201 executes these programs to execute their functions.

The file system control unit 2021 provides a file system to the terminal 10. In other words, the file system control unit 2021 makes data stored in volumes which are set in the disk drive 40 accessible to the terminal 10 as files.

The volume replication control unit 2022 controls operation related to copying and restoration of volumes set in the disk drive 40. The volume replication control unit 2022 contains volume pair management information 20221, which is information about volume pairs.

The WORM control unit 2023 controls WORM settings of data stored in volumes which are set in the disk drive 40. The WORM control unit 2023 contains WORM management information 20231, which is information about WORM data.

The device driver 2024 manages volumes set in the disk drive 40. More specifically, the device driver 2024 converts a device number, which is assigned to each volume, into device information, which is recognized by application software, and vice versa.

The I/F 203 exchanges data and requests with the terminal 10. The I/F 204 exchanges data and requests with the storage system 30.

The storage system 30 has a CPU 301, a memory 302, and interfaces (I/Fs) 303 and 304.

The CPU 301 executes a program stored in the memory 302 to execute processing prescribed in the program.

The memory 302 stores a WORM process unit 3021, a volume replication process unit 3022, and I/O process unit 3023. The CPU 301 executes these programs to execute their functions.

The WORM process unit 3021 executes processing related to WORM settings of data that is stored in volumes set in the disk drive 40. More specifically, the WORM process unit 3021 commits a file to a WORM state or terminates the WORM state of a file. The WORM process unit 3021 also prohibits a file in a WORM state from being changed or deleted for a designated period of time.

The volume replication process unit 3022 controls operation related to copying and restoration of volumes set in the disk drive 40. The volume replication process unit 3022 contains volume pair management information 30221, which is information about volume pairs.

The I/O process unit 3023 executes data I/O (input/output) processing in the disk drive 40 according to a request from the file server 20.

The I/F 303 exchanges data with the file server 20. The I/F 304 exchanges data with the disk drive 40. The I/F 304 complies with a protocol such as SCSI or fibre channel (FC) to send and receive data and control commands.

The disk drive 40 has one or more hard disk drives, which take a RAID configuration to constitute virtual devices. The virtual devices are divided into primary devices and secondary devices, in which the primary devices receive requests directly from the file server 20 and the secondary device back up data in the primary devices. Storage areas of these virtual devices are called volumes. In FIG. 1, a volume 401A is shown as a primary volume and a volume 401B is shown as a secondary volume.

The volumes 401A and 401B (hereinafter referred to as volumes 401 for simplification) each contain meta data 402 and data blocks 403. The meta data 402 holds information indicating attributes (e.g., WORM attributes) of data stored in the data blocks 403. The data blocks 403 stores data for each block.

The storage system is constituted of the above-described components.

FIG. 1 shows only one file server 20, but more than one file server 20 may be connected to the storage system 30. The file server 20, the storage system 30, and the disk drive 40, which are separate from one another in FIG. 1, may be housed in the same casing.

Request commands sent from the file server 20 to the storage system 30 will be described next.

The description here takes as an example a MODE SELECT command, which is a common SCSI command, but other request command forms using other protocols are also employable.

Figure 2A:
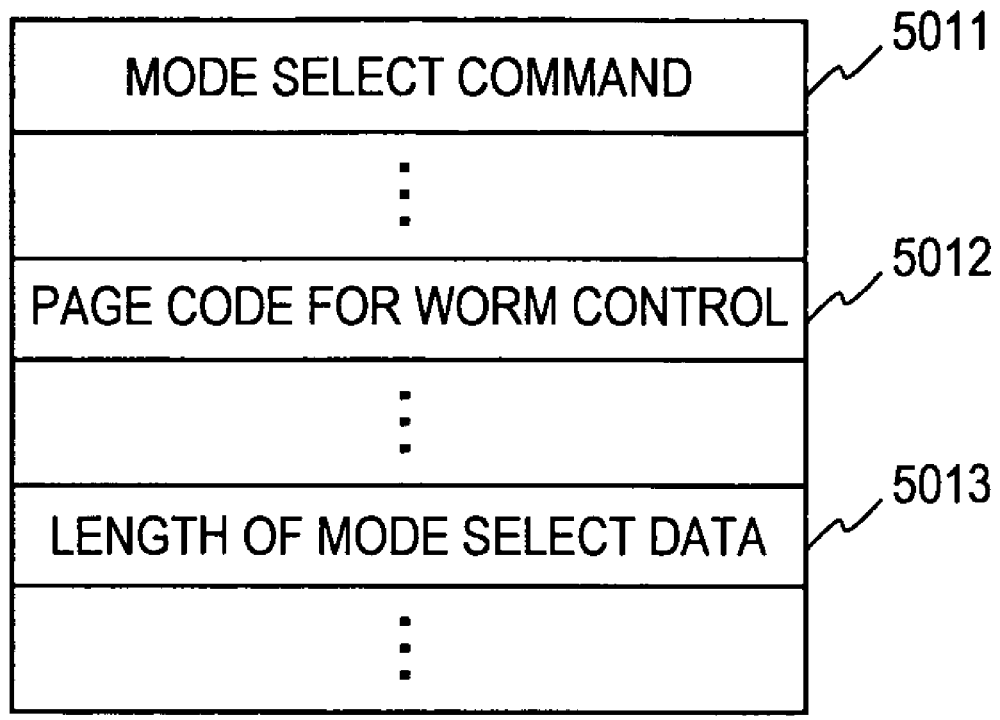
FIG. 2A is an explanatory diagram showing an I/O FORM of a request command for WORM control.
Figure 2B:
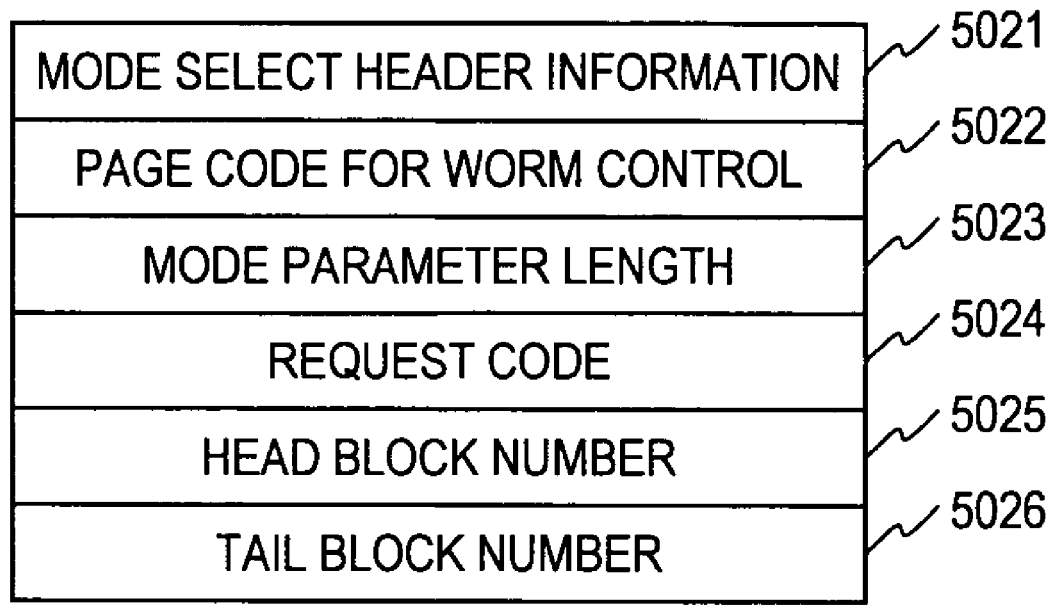
FIG. 2B is an explanatory diagram showing a mode parameter FORM of a request command for WORM control.

FIGS. 2A and 2B are explanatory diagrams showing an I/O FORM and mode parameter FORM of a request command for WORM control.

FIG. 2A shows an I/O FORM of a request command for WORM control.

The file server 20 sends a request command having this I/O FORM, thereby instructing the storage system 30 to perform WORM control. In other words, the file server 20 requests to set a file to a WORM state, terminate the WORM state of a file, and the like. Specifics of the instruction are included in a mode parameter shown in FIG. 2B.

The request command FORM for WORM control is denoted by 501, and contains a MODE SELECT command 5011, a page code 5012 for WORM control, and a length 5013 of MODE SELECT data.

The MODE SELECT command 5011 is information indicating that the I/O data is a MODE SELECT command. The WORM control page code 5012 is information indicating that the I/O is for WORM control. The MODE SELECT data length 5013 indicates the data length of the I/O data.

FIG. 2B shows a mode parameter FORM of a request command for WORM control.

A mode parameter 502 contains MODE SELECT header information 5021, a page code 5022 for WORM control, a mode parameter length 5023, a request code 5024, a head block number 5025, and a tail block number 5026.

The MODE SELECT header information 5021 contains basic information of this MODE SELECT command. The page code 5022 for WORM control is information indicating that this mode parameter is for WORM control. The mode parameter length 5023 indicates the data length of the mode parameter.

The request code 5024 is information indicating what request code is designated by this mode parameter. Set as the request code 5024 is any one of WORM state setting code and WORM state terminating code.

The head block number 5025 and the tail block number 5026 indicate a storing position of data to which the request by this mode parameter is directed.

Figure 3A:
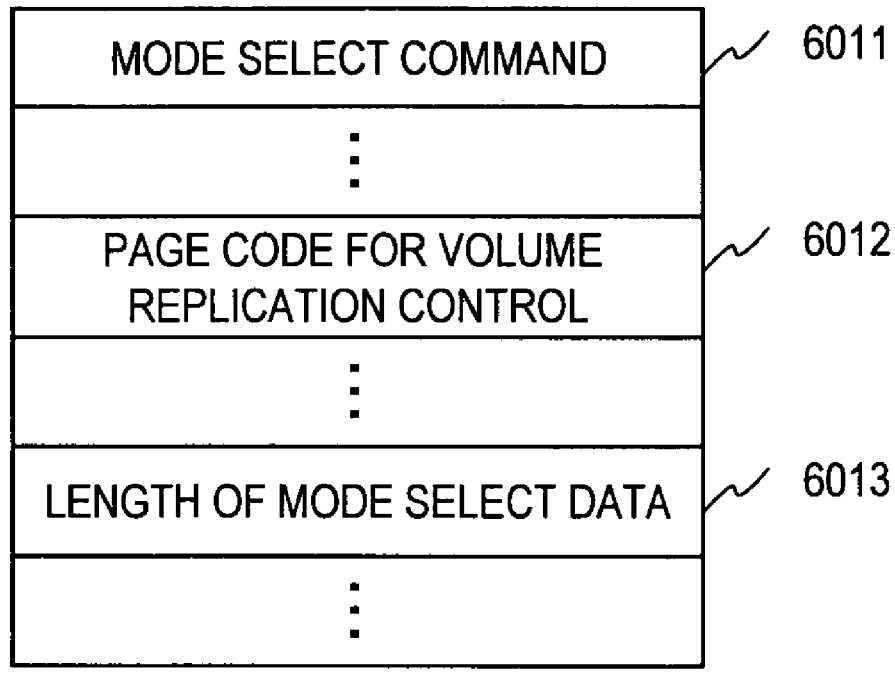
FIG. 3A is an explanatory diagram showing an I/O FORM of a request command for volume replication control.
Figure 3B:
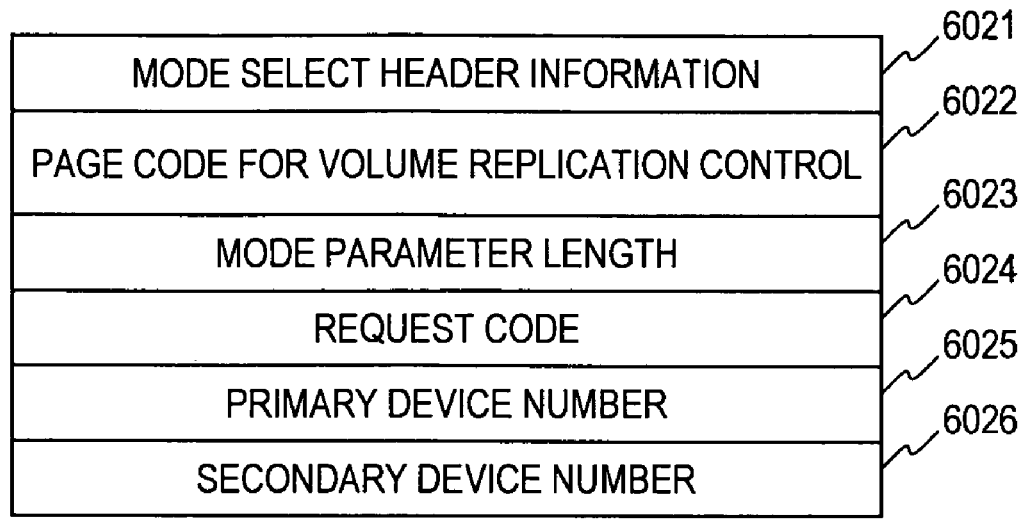
FIG. 3B is an explanatory diagram showing a mode parameter FORM of a request command for volume replication control.

FIGS. 3A and 3B are explanatory diagrams showing an I/O FORM and mode parameter FORM of a request command for volume replication control.

FIG. 3A shows an I/O form of a request command for volume replication control.

The file server 20 sends a request command having this I/O FORM, thereby instructing the storage system 30 to perform control related to volume replication. In other words, the file server 20 requests for volume pair definition, volume pair break-up, volume backup, volume backup, volume restoration, and the like. Specifics of the instruction are included in a mode parameter shown in FIG. 3B.

This request command FORM is denoted by 601, and contains a MODE SELECT command 6011, a page code 6012 for volume replication control and a length 6013 of MODE SELECT data.

The MODE SELECT command 6011 is information indicating that the I/O data is a MODE SELECT command. The page code 6012 for volume replication control is information indicating that the I/O is for volume replication control. The MODE SELECT data length 6013 indicates the data length of the I/O data.

FIG. 3B shows a mode parameter FORM of a request command for volume replication control.

A mode parameter 602 contains MODE SELECT header information 6021, a page code 6022 for volume replication control, a mode parameter length 6023, a request code 6024, a primary device number 6025, and a secondary device number 6026.

The MODE SELECT header information 6021 contains basic information of this MODE SELECT command. The page code 6022 for volume replication control is information indicating that this mode parameter is for volume replication control. The mode parameter length 6023 indicates the data length of the mode parameter.

The request code 6024 is information indicating what request code is designated by this mode parameter. Set as the request code 6024 is one chosen from such request codes as volume pair definition, volume pair break-up, backup of a primary volume to a secondary volume, and restoration of a primary volume from a secondary volume.

The primary device number 6025 and the secondary device number 6026 indicate to which primary device and secondary device the request by this mode parameter is directed.

Various types of information stored in the file server 20 and in the storage system 30 will be described next.

Figure 4:
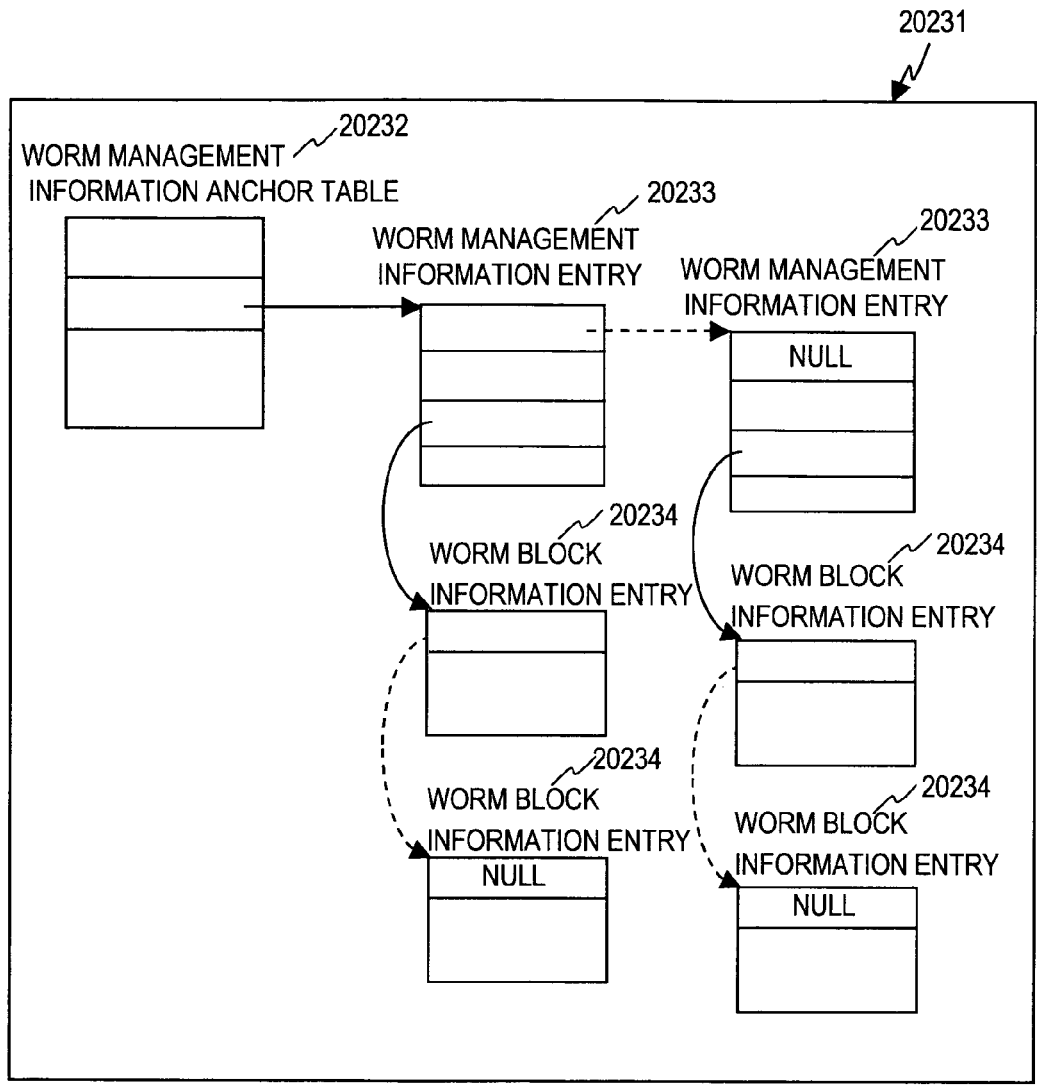
FIG. 4 is an explanatory diagram showing details of WORM management information.

FIG. 4 is an explanatory diagram showing details of the WORM management information 20231.

The WORM management information 20231 is information managed by the WORM control unit 2023 of the file server 20, and holds information related to WORM control over data stored in the disk drive 40, which is controlled by the storage system 30.

The WORM management information 20231 is managed in a unidirectional queue format.

The WORM management information 20231 contains a WORM management information anchor table 20232, a WORM management information entry 20233, and a WORM block information entry 20234.

The WORM management information anchor table 20232 contains a pointer to point which WORM management information entry 20233 is the queue head entry. Each WORM management information entry 20233 holds information on data committed to a WORM state.

The WORM management information entry 20233 contains a pointer to point which WORM block information entry 20234 is the queue head entry. Each WORM block information entry 20234 holds information on the block position of data committed to a WORM state. The WORM management information entry 20233 also holds information about WORM settings of this data. In the case where other data is successfully set to a WORM state, the WORM management information entry 20233 further contains a pointer to point another WORM management information entry 20233.

Each WORM block information entry 20234 holds the block position of data committed to a WORM state. In the case where the data is stored in discontinuous blocks instead of continuous blocks, the WORM block information entry 20234 contains a pointer to point which WORM block information entry 20234 holds information of the next block position.

Figure 5:
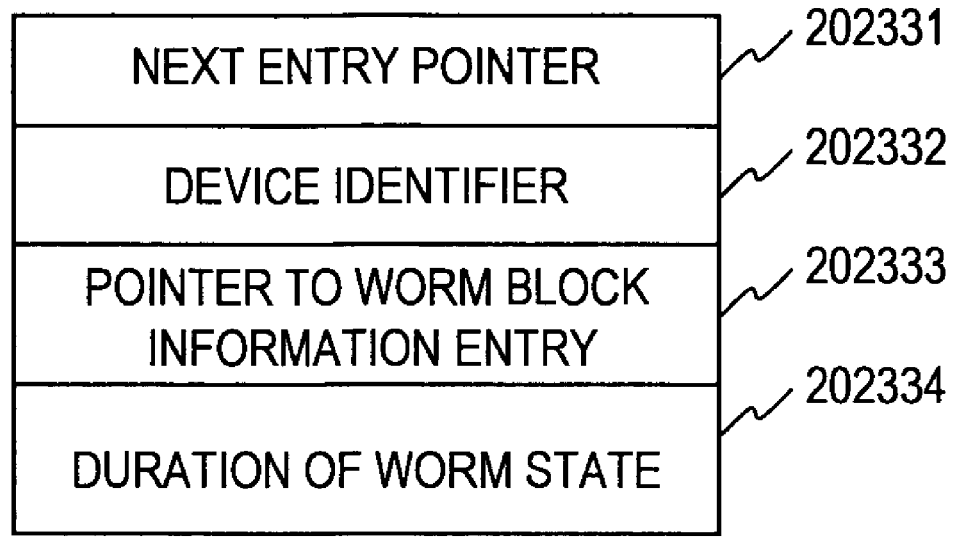
FIG. 5 is an explanatory diagram showing a configuration of a WORM management information entry.

FIG. 5 is an explanatory diagram showing a configuration of the WORM management information entry 20233.

The WORM management information entry 20233 contains a NEXT entry pointer 202331, a device identifier 202332, a pointer 202333 to a WORM block information entry and duration 202334 of WORM state.

Stored as the NEXT entry pointer 202331 is a pointer to another WORM management information entry 20233. NULL is stored as the NEXT entry pointer 202331 of the last WORM management information entry 20233.

Stored as the device identifier 202332 is an identifier indicating a device of a volume which stores the data.

Stored as the WORM block information entry pointer 202333 is a pointer to the WORM block information entry 20234 that indicates the block position where the data is stored.

Stored as the WORM state duration 202334 is a period in which the WORM data remains in a WORM state.

Figure 6:
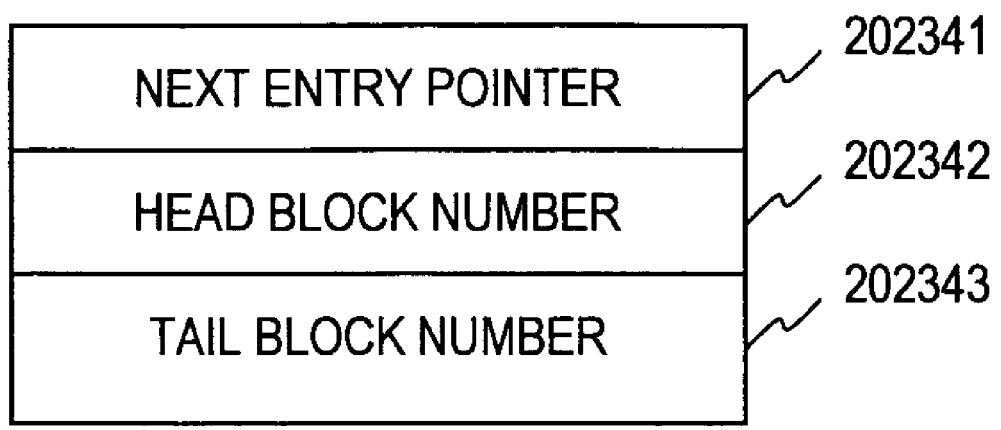
FIG. 6 is an explanatory diagram showing a configuration of a WORM block information entry.

FIG. 6 is an explanatory diagram showing a configuration of the WORM block information entry 20234.

The WORM block information entry 20234 contains a NEXT entry pointer 202341, a head block number 202342, and a tail block number 202343.

Stored as the NEXT entry pointer 202341 is a pointer to point which WORM block information entry 20234 is to store block information next when data is in discontinuous blocks. NULL is stored as the NEXT entry pointer 202341 of the last WORM block information entry 20234.

Figure 7:
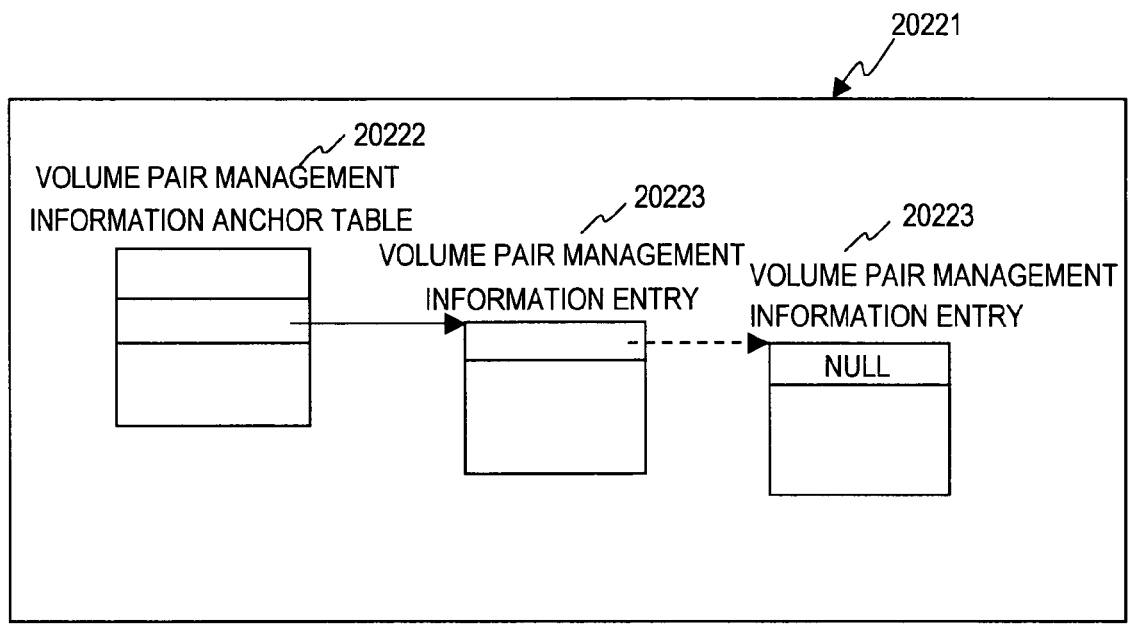
FIG. 7 is an explanatory diagram showing a configuration of volume pair management information on a server side.

FIG. 7 is an explanatory diagram showing the configuration of the volume pair management information 20221, which is managed by the volume replication control unit 2022 of the file server 20.

The volume pair management information 20221 is managed by the file server 20 whereas the volume pair management information 30221 is managed by the storage system 30. The volume pair management information 20221 and the volume pair management information 30221 contain information common to each other.

Similar to the WORM management information 20231, the volume pair management information 20221 is managed in a unidirectional queue format.

The volume pair management information 20221 contains a volume pair management information anchor table 20222 and a volume pair management information entry 20223.

The volume pair management information anchor table 20222 contains a pointer to point which volume pair management information entry 20223 is the queue head entry. Each volume pair management information entry 20223 holds information on a volume pair.

The volume pair management information entry 20223 holds information on a pair, and information on volumes that constitute the pair.

Figure 8:
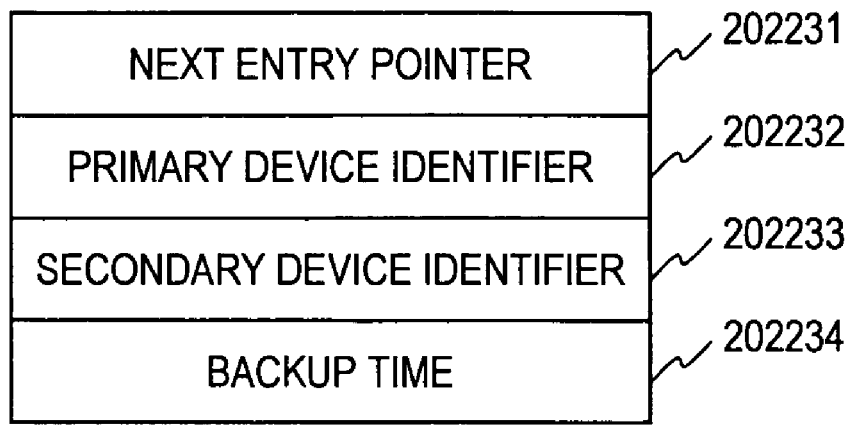
FIG. 8 is an explanatory diagram showing a configuration of a volume pair management information entry on a server side.

FIG. 8 is an explanatory diagram showing the configuration of the volume pair management information entry 20223.

The volume pair management information entry 20223 contains a NEXT entry pointer 202231, a primary device identifier 202232, a secondary device identifier 202233 and backup time 202234.

Stored as the NEXT entry pointer 202331 is a pointer to another pair of volume pair management information entry 20223. NULL is stored as the NEXT entry pointer 202331 of the last volume pair management information entry 20223.

Stored as the primary device identifier 202232 is a device identifier with which a primary volume constituting the volume pair is identified.

Stored as the secondary device identifier 202233 is a device identifier with which a secondary volume constituting the volume pair is identified.

Stored as the backup time 202234 is a time at which backing up data in the primary volume to the secondary volume is completed.

Figure 9:
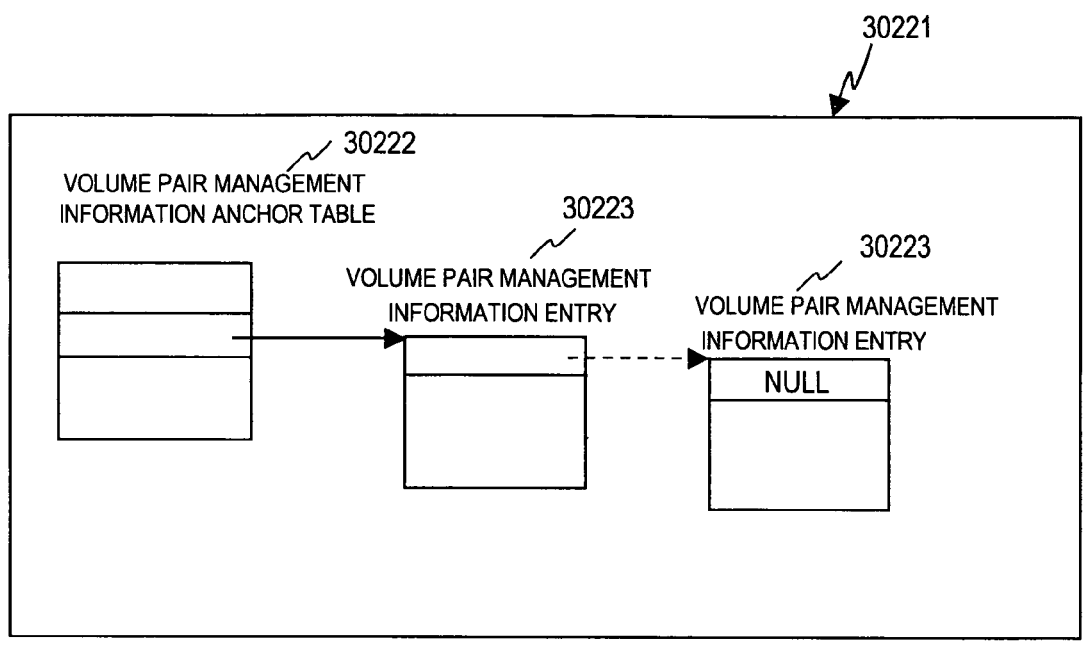
FIG. 9 is an explanatory diagram showing a configuration of volume pair management information on a storage system side.

FIG. 9 is an explanatory diagram showing the configuration of the volume pair management information 30221, which is managed by the volume replication process unit 3022 of the storage system 30.

Figure 10:
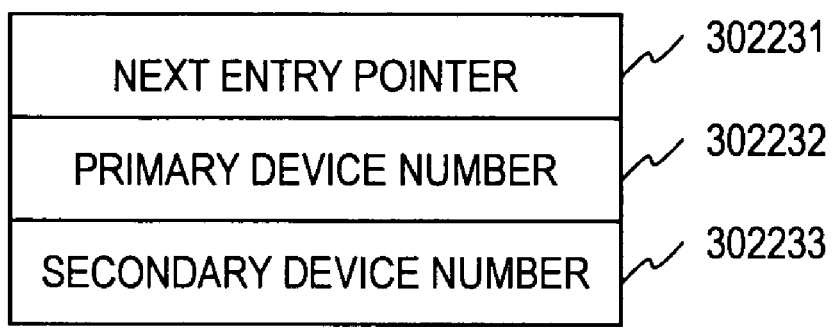
FIG. 10 is an explanatory diagram showing a configuration of a volume pair management information entry on a storage system side.

The volume pair management information 30221 has mostly the same configuration as the above-described volume pair management information 20221, which is managed by the volume replication control unit 2022 of the file server 20. A difference is that, as shown in FIG. 10, a volume pair management information entry 30223 has a primary device number 302232 and a secondary device number 302233, which are a converted form of the primary device identifier 202232 and the secondary device identifier 202233 that is processible by the storage system 30. Another difference is that the volume pair management information entry 30223 does not contain the backup time 202234. This is because the storage system 30 does not need to have information regarding backup time since data backup time of a volume pair is information that is needed mainly on the user application side.

Meta data stored in the volumes 401 of the disk drive 40 will be described next.

Figure 11:
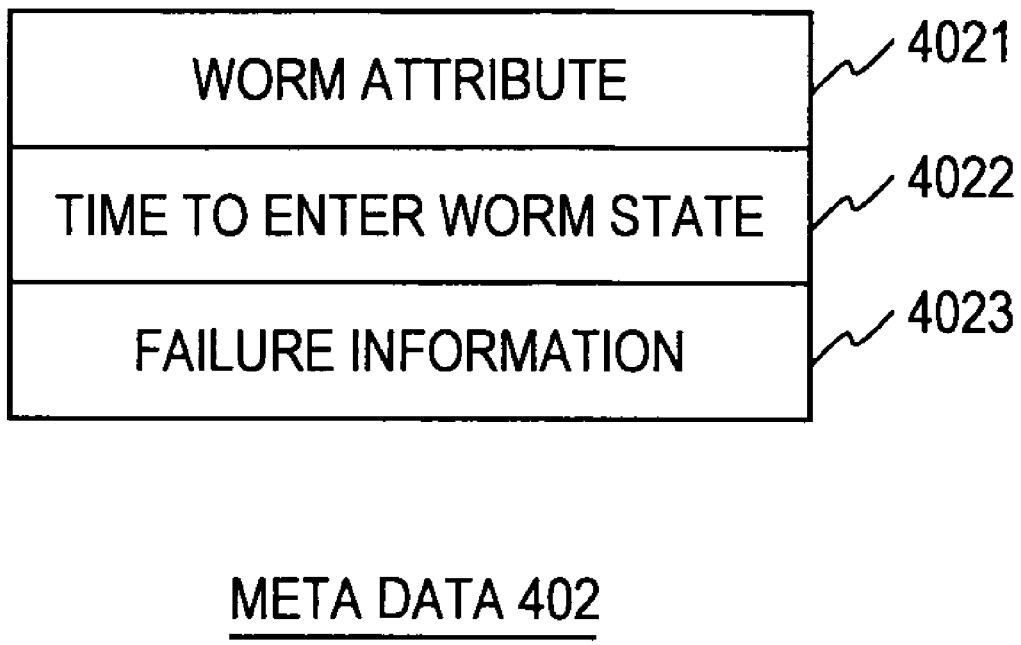
FIG. 11 is an explanatory diagram showing a configuration of meta data.

FIG. 11 is an explanatory diagram showing the configuration of the meta data 402.

Stored as meta data for each data stored in the volumes is information about attributes of the data.

The meta data 402 contains a WORM attribute 4021, a time 4022 to enter a WORM state, and failure information 4023.

Stored as the WORM attribute 4021 is information indicating whether data for which this meta data is made is set to a WORM state or not.

Stored as the time-to-enter-WORM-state 4022 is a time when data for which this meta data is made is set to a WORM state.

Stored as the failure information 4023 is information reporting, upon occurrence of a failure (e.g., read error/write error) in data for which this meta data is made, the failure.

Now, a description will be given on processing executed by the storage system of this embodiment.

Described first are processing to set data to a WORM state and processing to terminate the WORM state of data.

Figure 12A:
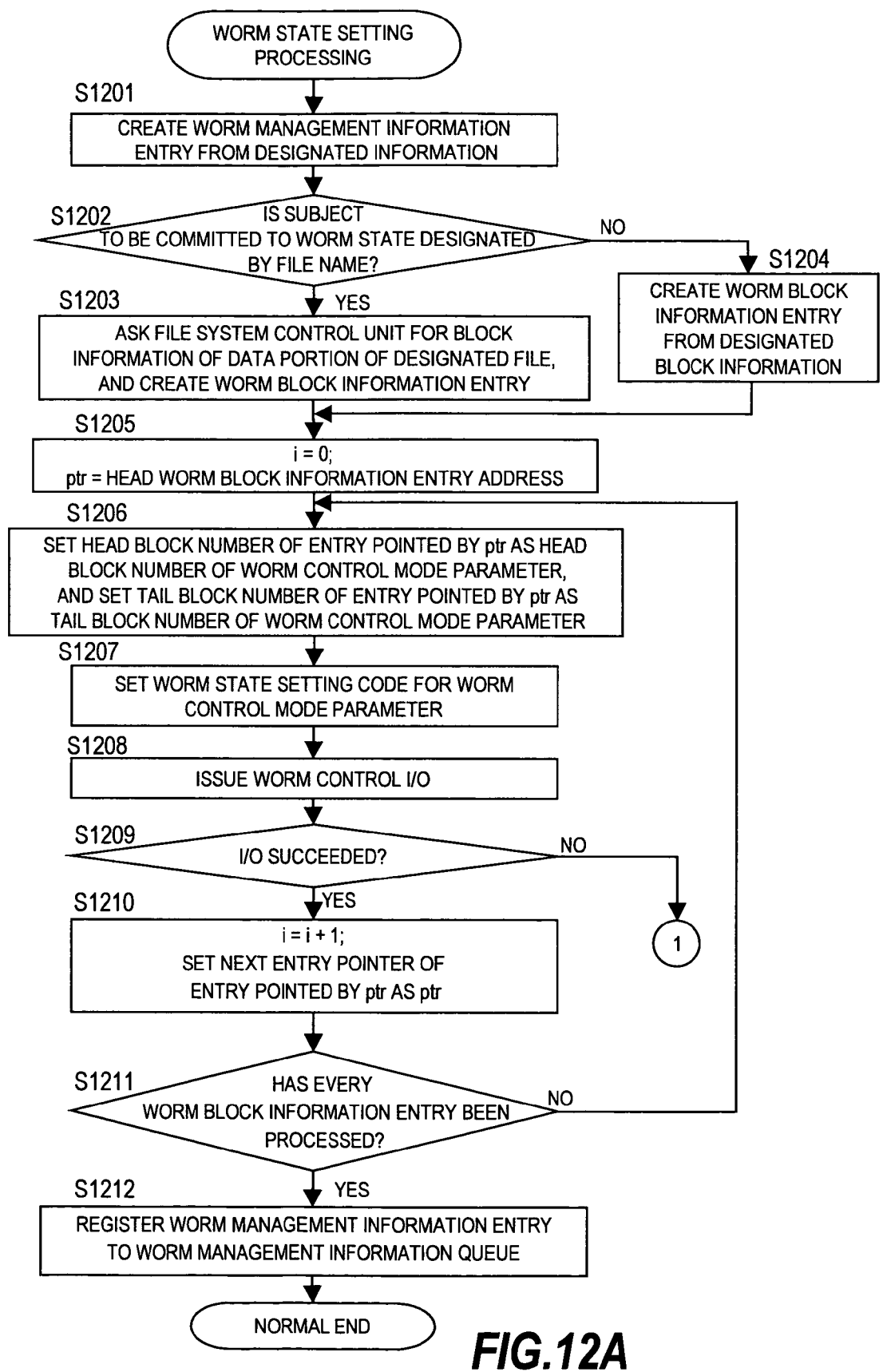
FIG. 12A is a flow chart for WORM state setting processing.
Figure 12B:
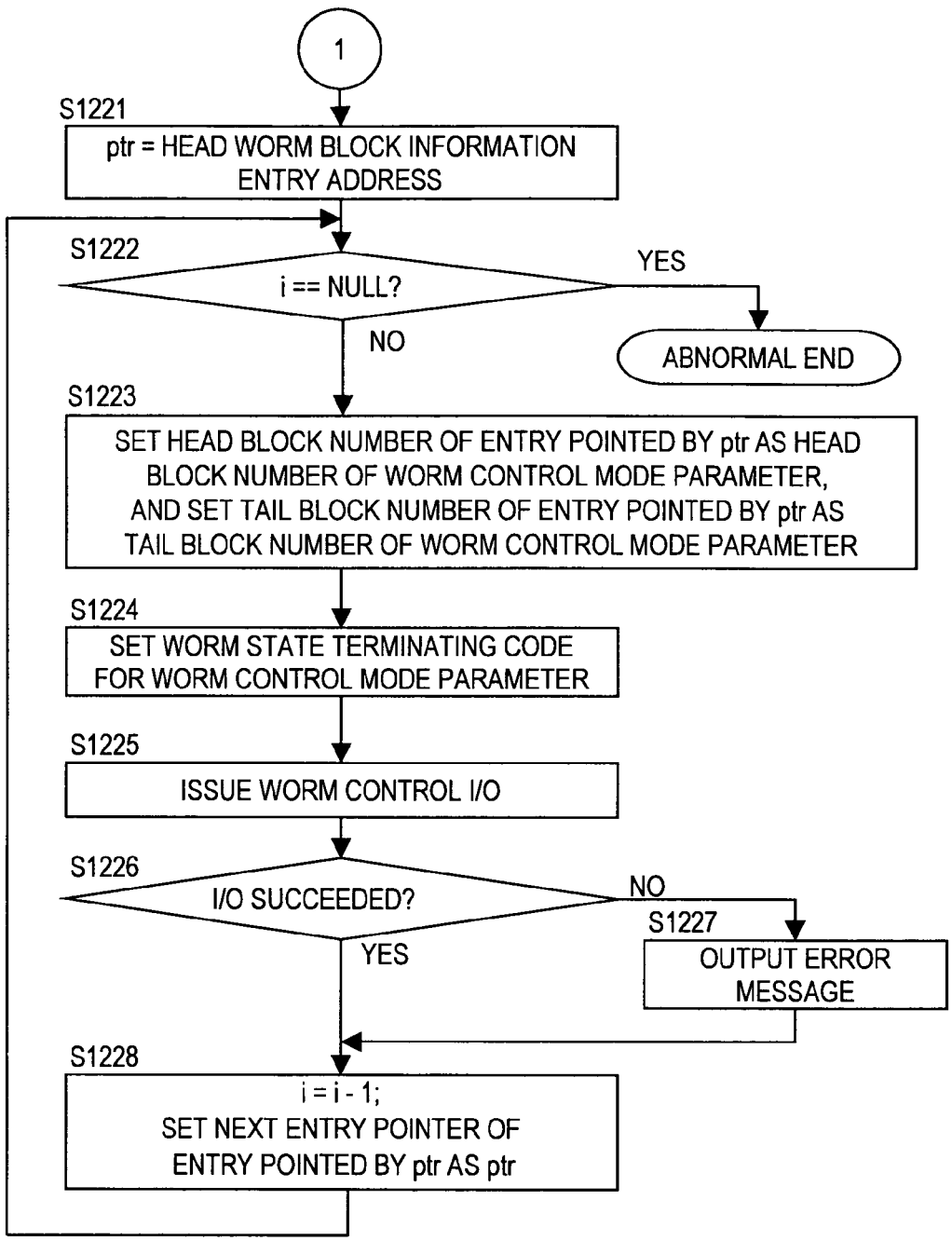
FIG. 12B is a flow chart for WORM state setting processing.

FIGS. 12A and 12B are flow charts for WORM state setting processing.

The flow charts are executed by the WORM control unit 2023 of the file server 20.

A user application in the terminal 10 requests to set a file to a WORM state, designating the device identifier of the volume 401A and a file name or a data block number which is stored in the volume 401A. Receiving the request, the WORM control unit 2023 starts the WORM state setting processing.

First, the WORM control unit 2023 creates the WORM management information entry 20233 from the designated information (S1201).

Next, the WORM control unit 2023 judges whether the subject requested to be committed to a WORM state is designated by a file name or by a data block number (S1202). When it is judged that the subject is designated by a file name, the processing moves to a step S1203 whereas the processing moves to a step S1204 when it is judged that the subject is designated by a block number.

In the step S1203, the WORM control unit 2023 asks the file system control unit 2021 about the designated file name. The file system control unit 2021 uses the provided file name as the key, and sends a block number list of a data portion of the corresponding file to the WORM control unit 2023 in response. Receiving this response, the WORM control unit 2023 creates, from the received block number list, the WORM block information entry 20234.

In the step S1204, on the other hand, the WORM control unit 2023 creates the WORM block information entry 20234 from the designated block number.

The WORM control unit 2023 then sets 0 to a variable i, which is for counting the number of repetition. The WORM control unit 2023 also stores, as a pointer ptr, the address of the WORM block information entry 20234 that is at the head of the queue (S1205).

The WORM control unit 2023 next creates a mode parameter for WORM control.

First, the WORM control unit 2023 sets, to a head block number 2025 of the WORM control mode parameter, the head block number of the WORM block information entry 20234 that is located by the address stored as the pointer ptr. The WORM control unit 2023 also sets, to a tail block number 2026 of the WORM control mode parameter, the tail block number of the WORM block information entry 20234 that is located by the address stored as the pointer ptr (S1206). Next, the WORM control unit 2023 sets a WORM state setting code as the request code of the WORM control mode parameter (S1207).

With the WORM control mode parameter now completely created, the WORM control unit 2023 issues WORM control I/O to the storage system 30 (S1208). Then the WORM control unit 2023 judges whether this WORM control I/O has succeeded or not (S1209).

When it is judged that the WORM control I/O has succeeded, the processing moves to a step S1210. When it is judged that the WORM control I/O has failed, the processing moves to a step S1221 of FIG. 12B.

In the step S1210, the counter variable i is added by 1. Then the NEXT entry pointer of the WORM block information entry 20234 that is located by the address stored as the current pointer ptr is stored as the new pointer ptr.

The WORM control unit 2023 next judges whether every WORM block information entry 20234 has been processed or not. The judgment is made by consulting the value of the pointer ptr and, when the ptr value is NULL, it is judged that every WORM block information entry has been processed (S1211).

Judging that every WORM block information entry 20234 has been processed, the WORM control unit 2023 moves to a step S1212. On the other hand, when there is any unprocessed WORM block information entry 20234 left (i.e., when ptr is not NULL), the WORM control unit 2023 returns to the step S1206 to repeat the processing.

In the step S1212, the WORM management information entry 20233 is registered to a queue in the WORM management information anchor table 20232, and the processing is ended.

A data block partially set to a WORM state by the WORM state setting processing leaves the WORM state through processing of the step S1221 to a step S1228.

First, in the step S1221, the address of the WORM block information entry 20234 that is at the head of the queue is stored as the pointer ptr.

Next, whether the variable i is NULL or not is judged (S1222). When the variable i is NULL, it means that every portion of the data block that has been partially set to a WORM state by the WORM state setting processing has already received WORM state terminating processing. Accordingly, the WORM control unit 2023 sends an error message to the terminal 10 that has made the request, and the processing is ended abnormally.

When the variable i is not NULL, the head block number of the WORM block information entry 20234 that is located by the address stored as the pointer ptr is set to the head block number 2025 of the WORM control mode parameter. The WORM control unit 2023 also sets, to the tail block number 2026 of the WORM control mode parameter, the tail block number of the WORM block information entry 20234 that is located by the address stored as the pointer ptr (S1223).

Next, the WORM control unit 2023 sets a WORM state terminating code as the request code of the WORM control mode parameter (S1224).

With the WORM control mode parameter now completely created, the WORM control unit 2023 issues WORM control I/O to the storage system 30 (S1225). Then the WORM control unit 2023 judges whether this WORM control I/O has succeeded or not (S1226).

When it is judged that the WORM control I/O has succeeded, the processing moves to the step S1228. When it is judged that the WORM control I/O has failed, the processing moves to a step S1227.

In the step S1227, the WORM control unit 2023 issues an error message notifying of the failure of the WORM state setting I/O, and moves to the step S1228.

In the step S1228, the counter variable i is subtracted by 1. Then the NEXT entry pointer of the WORM block information entry 20234 that is located by the address stored as the current pointer ptr is stored as the new pointer ptr. The WORM control unit 2023 returns to the step S1222 to repeat the processing.

Through the above processing, setting the storage system 30 to commit data in the volume 401A to a WORM state is completed.

Figure 13A:
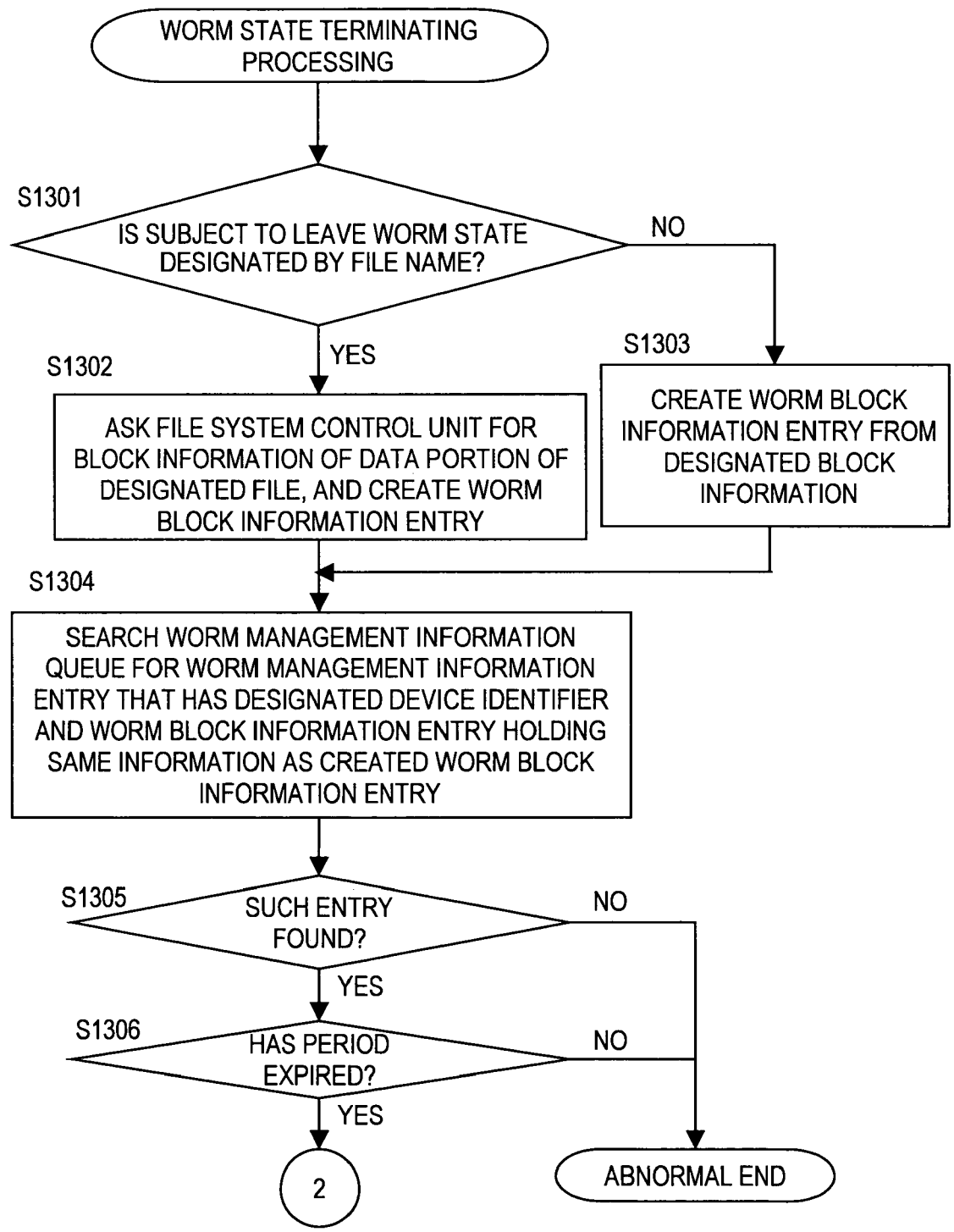
FIG. 13A is a flow chart for WORM state terminating processing.
Figure 13B:
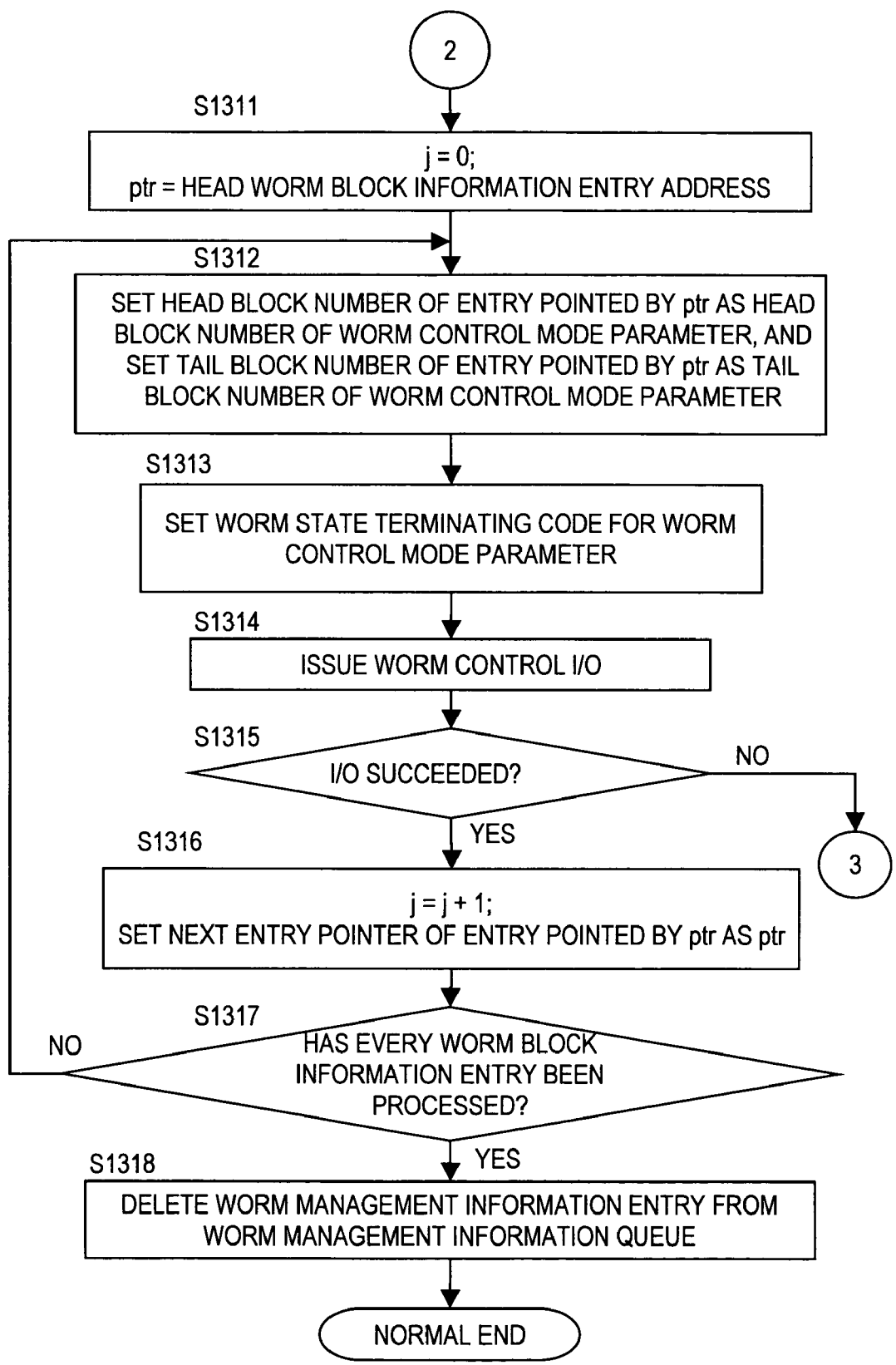
FIG. 13B is a flow chart for WORM state terminating processing.
Figure 13C:
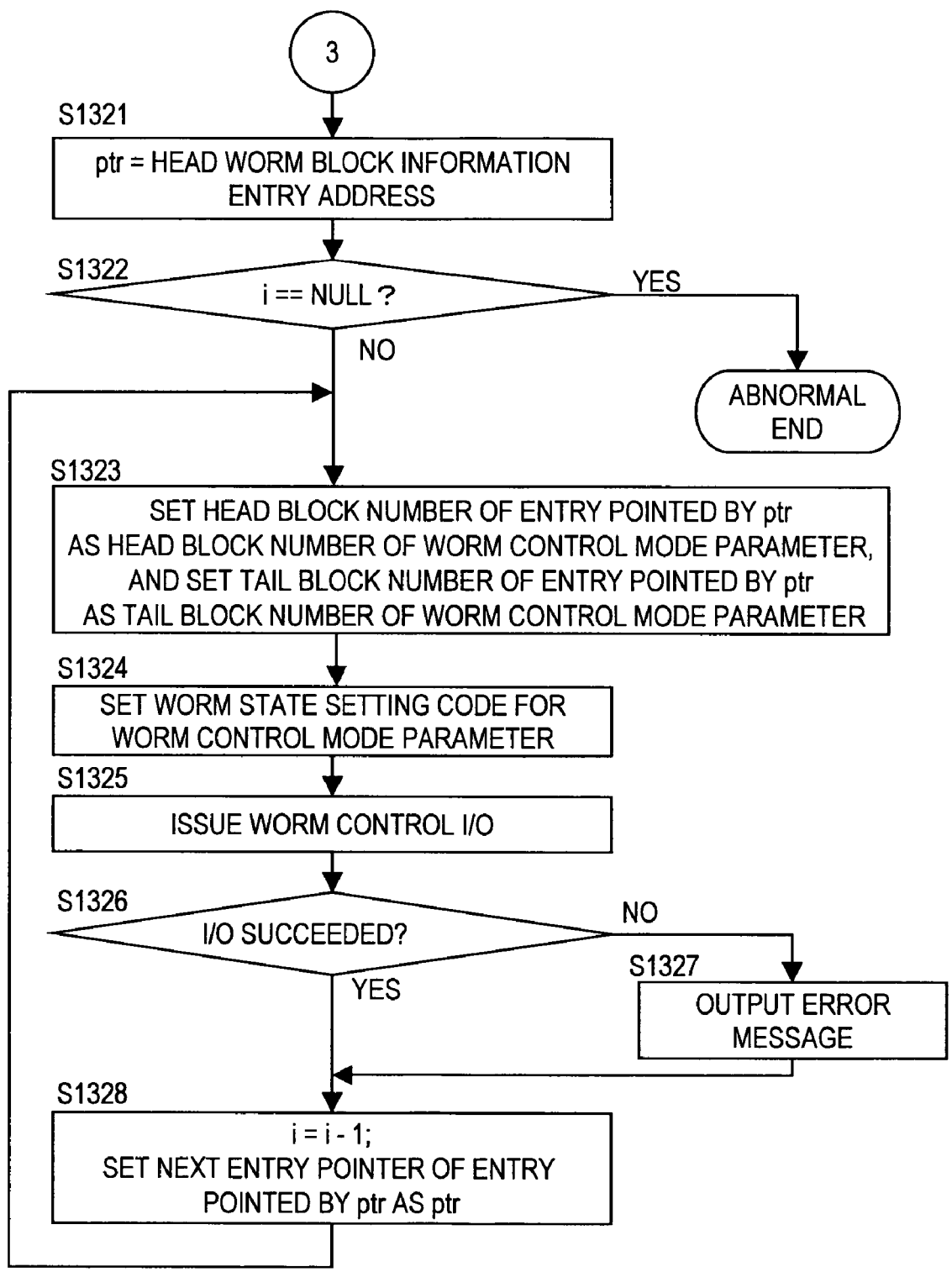
FIG. 13C is a flow chart for WORM state terminating processing.

FIGS. 13A to 13C are flow charts for WORM state terminating processing.

The WORM state terminating processing is executed only after a file that is to leave a WORM state finishes its WORM state period.

The flow charts are executed by the WORM control unit 2023 of the file server 20.

A user application in the terminal 10 requests to terminate the WORM state of a file, designating the device identifier of the volume 401A and a file name or a data block number which is stored in the volume 401A. Receiving the request, the WORM control unit 2023 starts the WORM state terminating processing.

First, the WORM control unit 2023 judges whether the subject requested to leave a WORM state is designated by a file name or by a data block number (S1301). When it is judged that the subject is designated by a file name, the processing moves to a step S1302 whereas the processing moves to a step S1303 when it is judged that the subject is designated by a block number.

In the step S1302, the WORM control unit 2023 asks the file system control unit 2021 about the designated file name. The file system control unit 2021 uses the provided file name as the key, and sends a block number list of a data portion of the corresponding file to the WORM control unit 2023 in response. Receiving this response, the WORM control unit 2023 creates, from the received block number list, the WORM block information entry 20234.

In the step S1303, on the other hand, the WORM control unit 2023 creates the WORM block information entry 20234 from the designated block number.

The WORM control unit 2023 then searches the WORM management information anchor table of the WORM management information 20231 for a WORM management information entry containing a WORM block information entry that has the device identifier of the volume 401A designated by the user application and the same information as the WORM block information entry created in the step S1302 or S1303 (S1304). The WORM control unit 2023 then judges whether the table has this WORM management information entry or not (S1305).

When it is judged that the table has such entry, the processing moves to a step S1306. On the other hand, when it is judged that there is no such entry, it means that the requested WORM data does not exist. Accordingly, the WORM control unit 2023 sends an error message to the terminal 10 that has made the request, and the processing is ended abnormally.

In the step S1306, the WORM control unit 2023 judges whether the designated WORM file has already finished its WORM state period or not. When it is judged that the WORM state period has not expired, the WORM state terminating processing for the requested WORM data cannot be executed. Accordingly, the WORM control unit 2023 sends an error message to the terminal 10 that has made the request, and the processing is ended abnormally.

When it is judged that the WORM state period has expired, the processing moves to a step S1311 of FIG. 13B.

In the step S1311, the WORM control unit 2023 sets 0 to the variable j, which is for counting the number of repetition. The WORM control unit 2023 also stores, as the pointer ptr, the address of the WORM block information entry 20234 that is at the head of the queue.

The WORM control unit 2023 next creates a mode parameter for WORM control.

First, the WORM control unit 2023 sets, to the head block number 2025 of the WORM control mode parameter, the head block number of the WORM block information entry 20234 that is located by the address stored as the pointer ptr. The WORM control unit 2023 also sets, to the tail block number 2026 of the WORM control mode parameter, the tail block number of the WORM block information entry 20234 that is located by the address stored as the pointer ptr (S1312). Next, the WORM control unit 2023 sets a WORM state terminating code as the request code of the WORM control mode parameter (S1313).

With the WORM control mode parameter now completely created, the WORM control unit 2023 issues WORM control I/O to the storage system 30 (S1314). Then the WORM control unit 2023 judges whether this WORM control I/O has succeeded or not (S1315).

When it is judged that the WORM control I/O has succeeded, the processing moves to a step S1316. When it is judged that the WORM control I/O has failed, the processing moves to a step S1321 of FIG. 13C.

In the step S1316, the counter variable j is added by 1. Then the NEXT entry pointer of the WORM block information entry 20234 that is located by the current pointer ptr is stored as the new pointer ptr.

The WORM control unit 2023 next judges whether every WORM block information entry 20234 has been processed or not. The judgment is made by consulting the value of the pointer ptr and, when the ptr value is NULL, it is judged that every WORM block information entry has been processed (S1317).

Judging that every WORM block information entry 20234 has been processed, the WORM control unit 2023 moves to a step S1318. On the other hand, when there is any unprocessed WORM block information entry 20234 left (i.e., when ptr is not NULL), the WORM control unit 2023 returns to the step S1312 to repeat the processing.

In the step S1318, the WORM management information entry 20233 for the designated WORM data is deleted from the queue in the WORM management information anchor table 20232, and the processing is ended.

A data block a part of which has left a WORM state by the WORM state terminating processing is again committed to a WORM state through processing of steps S1321 to S1328.

First, in the step S1321, the address of the WORM block information entry 20234 that is at the head of the queue is stored as the pointer ptr.

Next, whether the variable i is NULL or not is judged (S1322). When the variable i is NULL, it means that every portion of the data block that has left a WORM state by the WORM state terminating processing has already re-committed to a WORM state. Accordingly, the processing is ended abnormally.

When the variable i is not NULL, the head block number of the WORM block information entry 20234 that is located by the address stored as the pointer ptr is set to the head block number 2025 of the WORM control mode parameter. The WORM control unit 2023 also sets, to the tail block number 2026 of the WORM control mode parameter, the tail block number of the WORM block information entry 20234 that is located by the address stored as the pointer ptr (S1323).

Next, the WORM control unit 2023 sets a WORM state setting code as the request code of the WORM control mode parameter (S1324).

With the WORM control mode parameter now completed, the WORM control unit 2023 issues WORM control I/O to the storage system 30 (S1325). Then the WORM control unit 2023 judges whether this WORM control I/O has succeeded or not (S1326).

When it is judged that the WORM control I/O has succeeded, the processing moves to the step S1328. When it is judged that the WORM control I/O has failed, the processing moves to a step S1327.

In the step S1327, the WORM control unit 2023 issues a error message notifying of the failure of the WORM state setting I/O, and moves to the step S1328.

In the step S1228, the counter variable i is subtracted by 1. Then the NEXT entry pointer of the WORM block information entry 20234 that is located by the current pointer ptr is stored as the new pointer ptr. The WORM control unit 2023 returns to the step S1322 to repeat the processing.

Through the above processing, setting the storage system 30 to terminate the WORM state of a file in the volume 401A is completed.

A description will now be given on volume replication processing.

Described first is processing on the server side 20 which includes pair definition processing, pair break-up processing, backup processing, and restoration processing.

Figure 14:
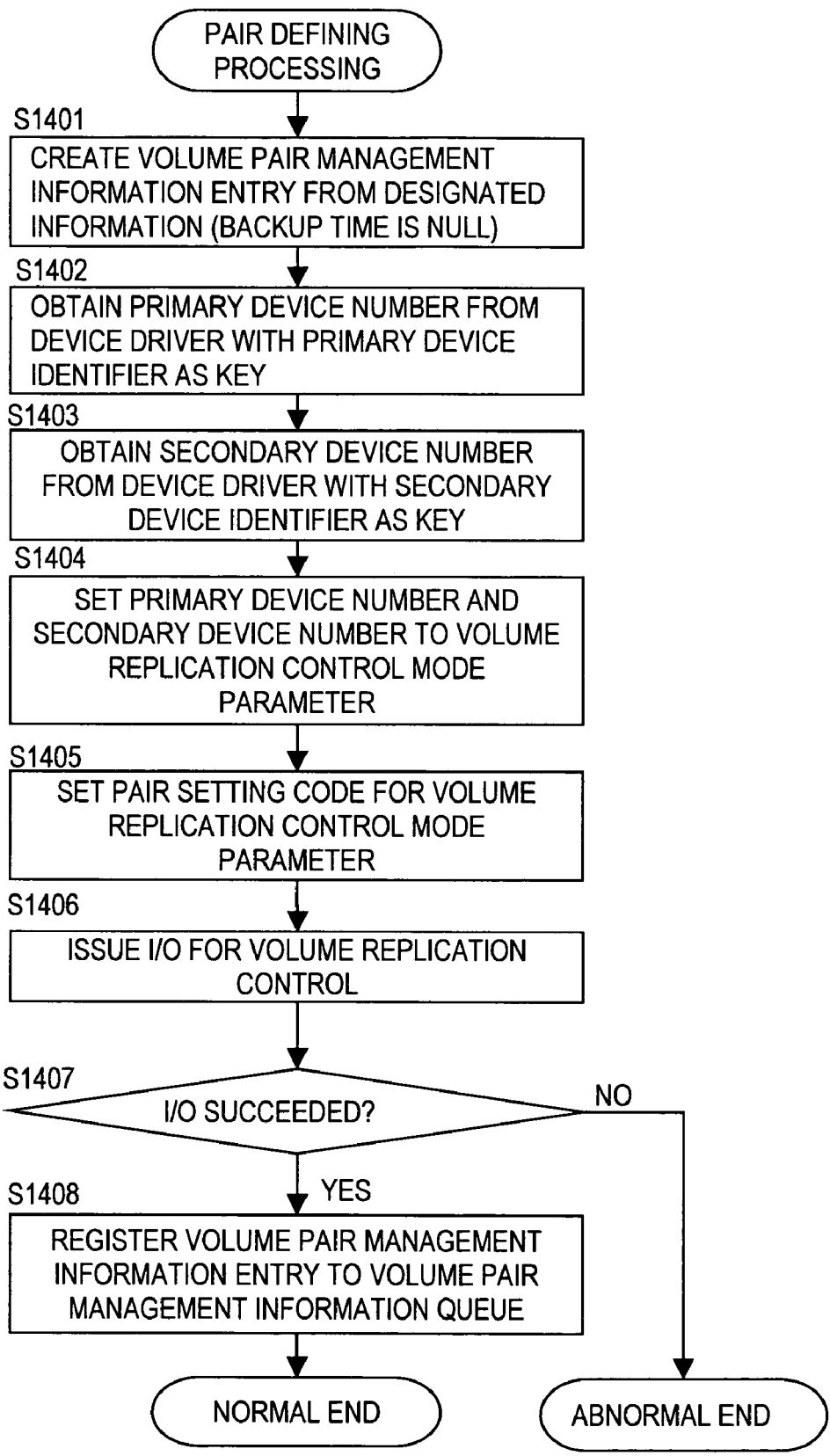
FIG. 14 is a flow chart for pair definition processing.

FIG. 14 is a flow chart for the pair definition processing. This flow chart is executed by the volume replication control unit 2022 of the file server 20.

A user application in the terminal 10 requests to define a volume pair, designating information of the volumes 401A and 401B which are to form a pair. Receiving the request, the volume replication control unit 2022 starts the pair definition processing.

First, the volume replication control unit 2022 creates, from the designated information, the volume management information entry 20223 of the volume pair management information 20221 (S1401). More specifically, the designated device identifier of the primary volume 401A is stored as the primary device identifier 202232 and the designated device identifier of the secondary volume 401B is stored as the secondary device identifier 202233. NULL is stored as the backup time 202234.

Next, the volume replication control unit 2022 asks the device driver 2024 about the primary device identifier. The device driver 2024 converts the inquired primary device identifier into a device number, and sends the device number to the volume replication control unit 2022 in response (S1402).

The volume replication control unit 2022 also asks the device driver 2024 about the secondary device identifier. The device driver 2024 converts the inquired secondary device identifier into a device number, and sends the device number to the volume replication control unit 2022 in response (S1403).

The volume replication control unit 2022 then creates a mode parameter for volume replication control. First, the volume replication control unit 2022 sets the obtained primary device number and secondary device number in the volume replication control mode parameter (S1404). A pair setting code is set next as the request code of the volume replication control mode parameter (S1405).

With the volume replication control mode parameter now completed, the volume replication control unit 2022 issues volume replication control I/O to the storage system 30 (S1406). Then the volume replication control unit 2022 judges whether this volume replication control I/O has succeeded or not (S1407).

When it is judged that the volume replication control I/O has succeeded, the processing moves to a step S1408. When it is judged that the volume replication control I/O has failed, an error message is sent to the terminal 10 that has made the request, and the processing is ended abnormally.

In the step S1408, the created volume pair management information entry is registered to a queue in the volume pair management information.

Through the above processing, a pair consisting of two volumes is defined.

Figure 15:
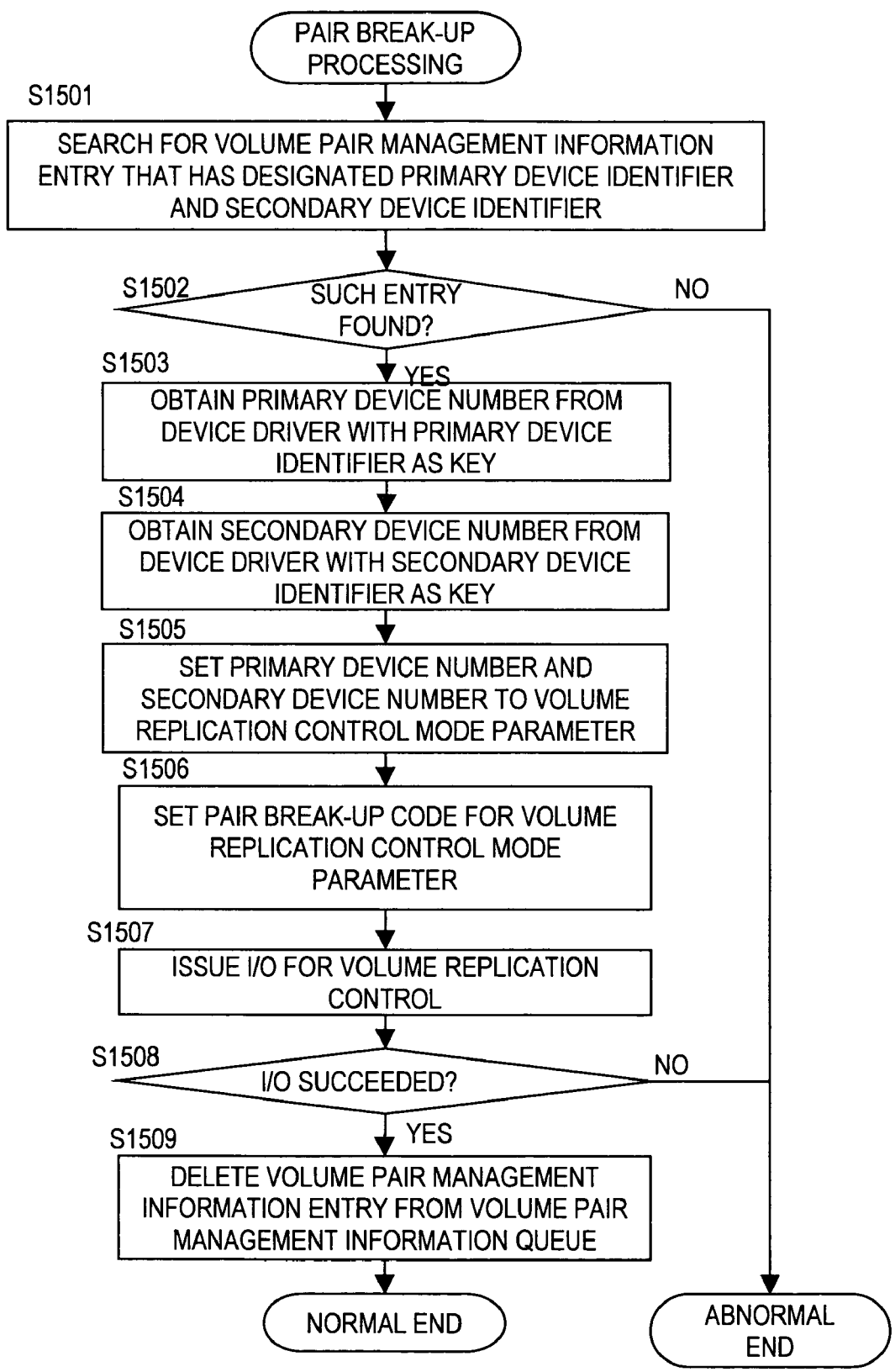
FIG. 15 is a flow chart for pair break-up processing.

FIG. 15 is a flow chart for the pair break-up processing.

This flow chart is executed by the volume replication control unit 2022 of the file server 20.

A user application in the terminal 10 requests to break up a volume pair, designating information of the volumes 401A and 401B which are to stop being a pair. Receiving the request, the volume replication control unit 2022 starts the pair break-up processing. The volume break-up processing is performed only on volumes forming a pair.

First, the volume replication control unit 2022 uses the designated information as a key to search the volume pair management information 20221 for the volume pair management information entry 20223 (S1501). More specifically, the volume replication control unit 2022 searches for the volume pair management information entry that contains the designated primary device identifier and secondary device identifier.

From the result of the search, the volume replication control unit 2022 judges whether the designated pair is in the volume pair management information or not (S1502).

When there is no entry that holds the designated pair, it means that the pair does not exist. Accordingly, an error message is sent to the terminal 10 that has made the request, and the processing is ended abnormally.

When there is an entry that holds the designated pair, the volume replication control unit 2022 first asks the device driver 2024 about the primary device identifier. The device driver 2024 converts the inquired primary device identifier into a device number, and sends the device number to the volume replication control unit 2022 in response (S1503).

The volume replication control unit 2022 next asks the device driver 2024 about the secondary device identifier. The device driver 2024 converts the inquired secondary device identifier into a device number, and sends the device number to the volume replication control unit 2022 in response (S1504).

The volume replication control unit 2022 then creates a mode parameter for volume replication control. First, the volume replication control unit 2022 sets the obtained primary device number and secondary device number in the volume replication control mode parameter (S1505). A pair break-up code is set next as the request code of the volume replication control mode parameter (S1506).

With the volume replication control mode parameter now completed, the volume replication control unit 2022 issues volume replication control I/O to the storage system 30 (S1507). Then the volume replication control unit 2022 judges whether this volume replication control I/O has succeeded or not (S1508).

When it is judged that the volume replication control I/O has succeeded, the processing moves to a step S1509. When it is judged that the volume replication control I/O has failed, an error message is sent to the terminal 10 that has made the request, and the processing is ended abnormally.

In the step S1509, the volume pair management information entry for the designated pair is deleted from the queue in the volume pair management information.

Through the above processing, a defined volume pair is broken up.

Figure 16:
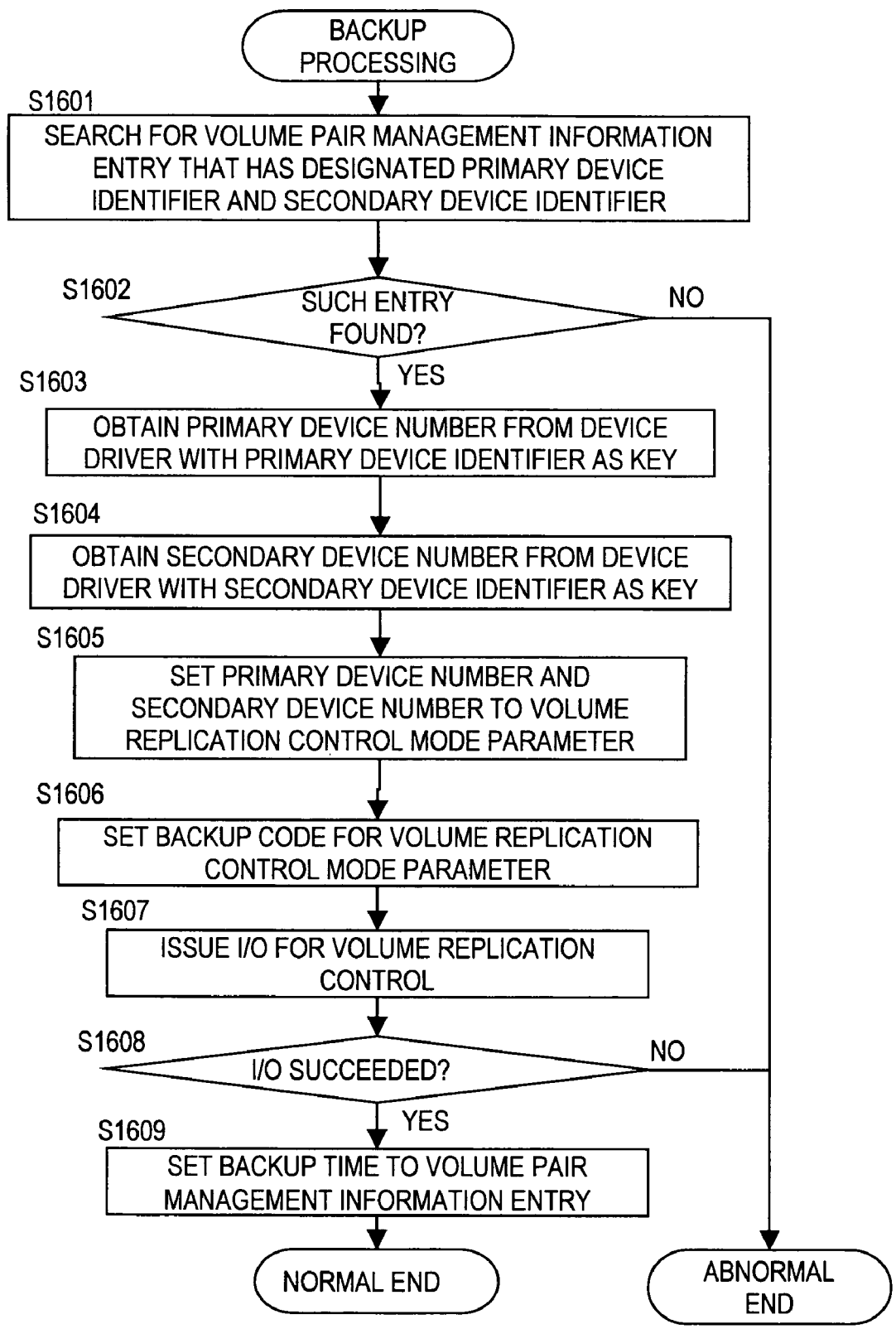
FIG. 16 is a flow chart for backup processing.

FIG. 16 is a flow chart for the backup processing.

This flow chart is executed by the volume replication control unit 2022 of the file server 20.

A user application in the terminal 10 requests to perform processing of copying data in a volume to another volume (backup processing), designating information of the primary device 401A and the secondary device 401B. Receiving the request, the volume replication control unit 2022 starts the backup processing. The process is performed only on volumes forming a pair.

First, the volume replication control unit 2022 uses the designated information as a key to search the volume pair management information 20221 for the volume pair management information entry 20223 (S1601). More specifically, the volume replication control unit 2022 searches for the volume pair management information entry that contains the designated primary device identifier and secondary device identifier.

From the result of the search, the volume replication control unit 2022 judges whether the designated pair is in the volume pair management information or not (S1602).

When there is no entry that holds the designated pair, it means that the pair does not exist. Accordingly, an error message is sent to the terminal 10 that has made the request, and the processing is ended abnormally.

When there is an entry that holds the designated pair, the volume replication control unit 2022 first asks the device driver 2024 about the primary device identifier. The device driver 2024 converts the inquired primary device identifier into a device number, and sends the device number to the volume replication control unit 2022 in response (S1603).

The volume replication control unit 2022 next asks the device driver 2024 about the secondary device identifier. The device driver 2024 converts the inquired secondary device identifier into a device number, and sends the device number to the volume replication control unit 2022 in response (S1604).

The volume replication control unit 2022 then creates a mode parameter for volume replication control. First, the volume replication control unit 2022 sets the obtained primary device number and secondary device number in the volume replication control mode parameter (S1605). A backup code is set next as the request code of the volume replication control mode parameter (S1606).

With the volume replication control mode parameter now completed, the volume replication control unit 2022 issues volume replication control I/O to the storage system 30 (S1607). Then the volume replication control unit 2022 judges whether this volume replication control I/O has succeeded or not (S1608).

When it is judged that the volume replication control I/O has succeeded, the processing moves to a step S1609. When it is judged that the volume replication control I/O has failed, an error message is sent to the terminal 10 that has made the request, and the processing is ended abnormally.

In the step S1609, the current time is set to the backup time 202234 in the volume pair management information entry 20223 for the designated pair.

Through the above processing, a volume pair is backed up.

Figure 17:
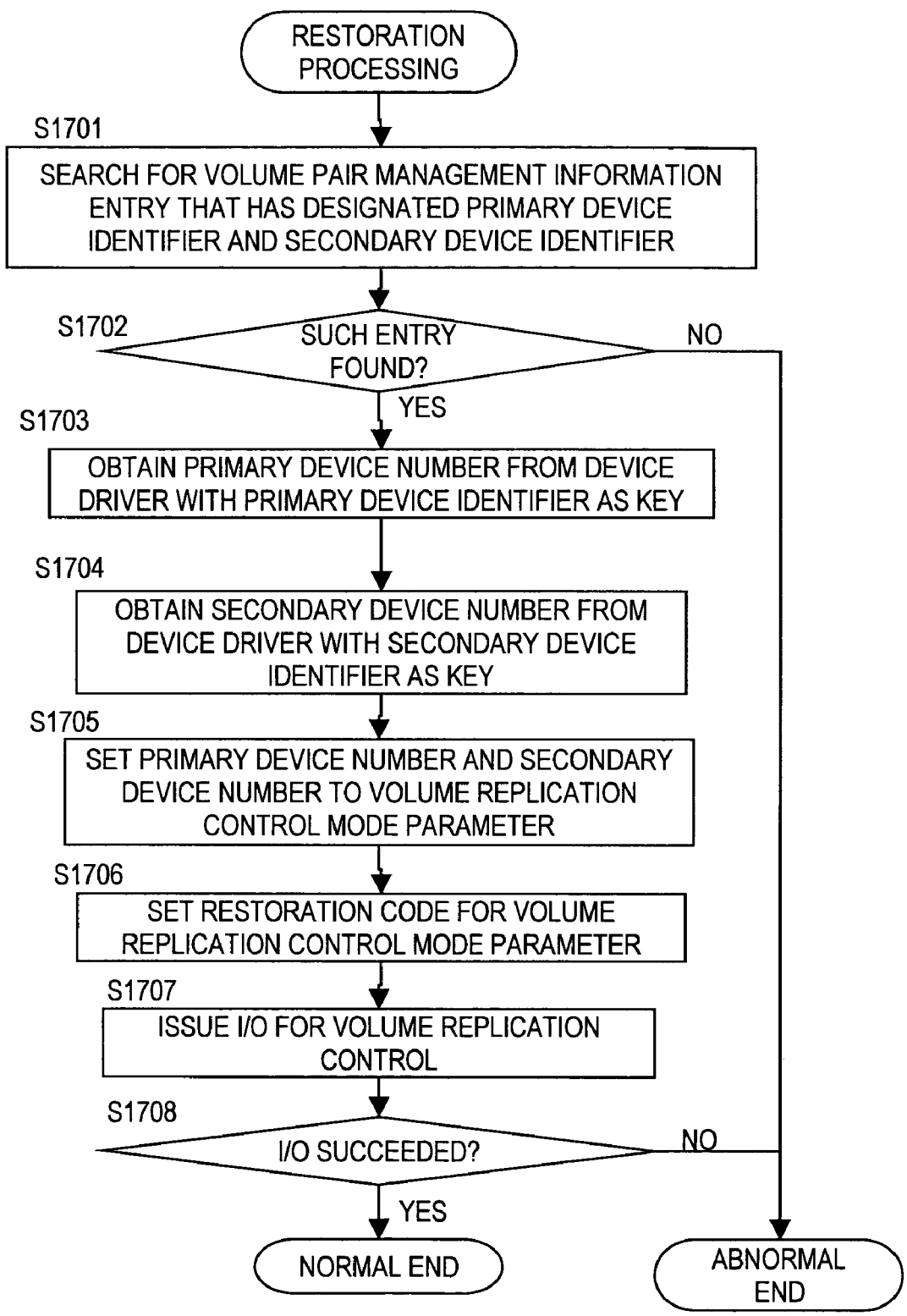
FIG. 17 is a flow chart for restoration processing.

FIG. 17 is a flow chart for the restoration processing.

This flow chart is executed by the volume replication control unit 2022 of the file server 20.

A user application in the terminal 10 requests to restore data in a volume, designating information of the primary device 401A and the secondary device 401B. Receiving the request, the volume replication control unit 2022 starts the restoration processing. The restoration processing is performed only on volumes forming a pair.

First, the volume replication control unit 2022 uses the designated information as a key to search the volume pair management information 20221 for the volume pair management information entry 20223 (S1701). More specifically, the volume replication control unit 2022 searches for the volume pair management information entry that contains the designated primary device identifier and secondary device identifier.

From the result of the search, the volume replication control unit 2022 judges whether the designated pair is in the volume pair management information or not (S1702).

When there is no entry that holds the designated pair, it means that the pair does not exist. Accordingly, an error message is sent to the terminal 10 that has made the request, and the processing is ended abnormally.

When there is an entry that holds the designated pair, the volume replication control unit 2022 first asks the device driver 2024 about the primary device identifier. The device driver 2024 converts the inquired primary device identifier into a device number, and sends the device number to the volume replication control unit 2022 in response (S1703).

The volume replication control unit 2022 next asks the device driver 2024 about the secondary device identifier. The device driver 2024 converts the inquired secondary device identifier into a device number, and sends the device number to the volume replication control unit 2022 in response (S1704).

The volume replication control unit 2022 then creates a mode parameter for volume replication control. First, the volume replication control unit 2022 sets the obtained primary device number and secondary device number in the volume replication control mode parameter (S1705). A restoration code is set next as the request code of the volume replication control mode parameter (S1706).

With the volume replication control mode parameter now completed, the volume replication control unit 2022 issues volume replication control I/O to the storage system 30 (S1707). Then the volume replication control unit 2022 judges whether this volume replication control I/O has succeeded or not (S1708).

When it is judged that the volume replication control I/O has succeeded, the processing is ended. When it is judged that the volume replication control I/O has failed, an error message is sent to the terminal 10 that has made the request, and the processing is ended abnormally.

Through the above processing, a volume pair is restored.

Processing on the side of the storage system 30 will be described next.

Figure 18A:
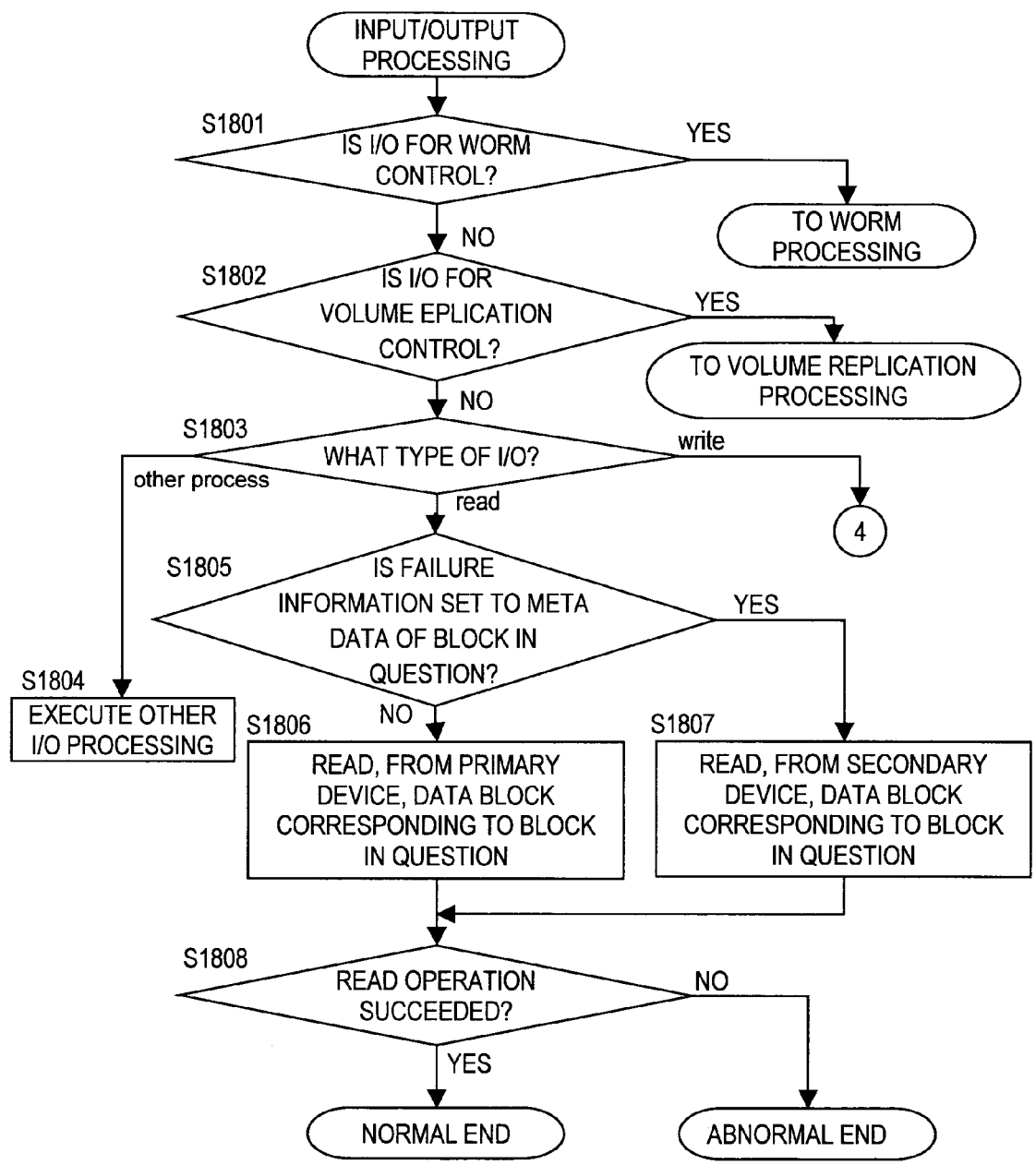
FIG. 18A is a flow chart for processing by an I/O process unit.
Figure 18B:
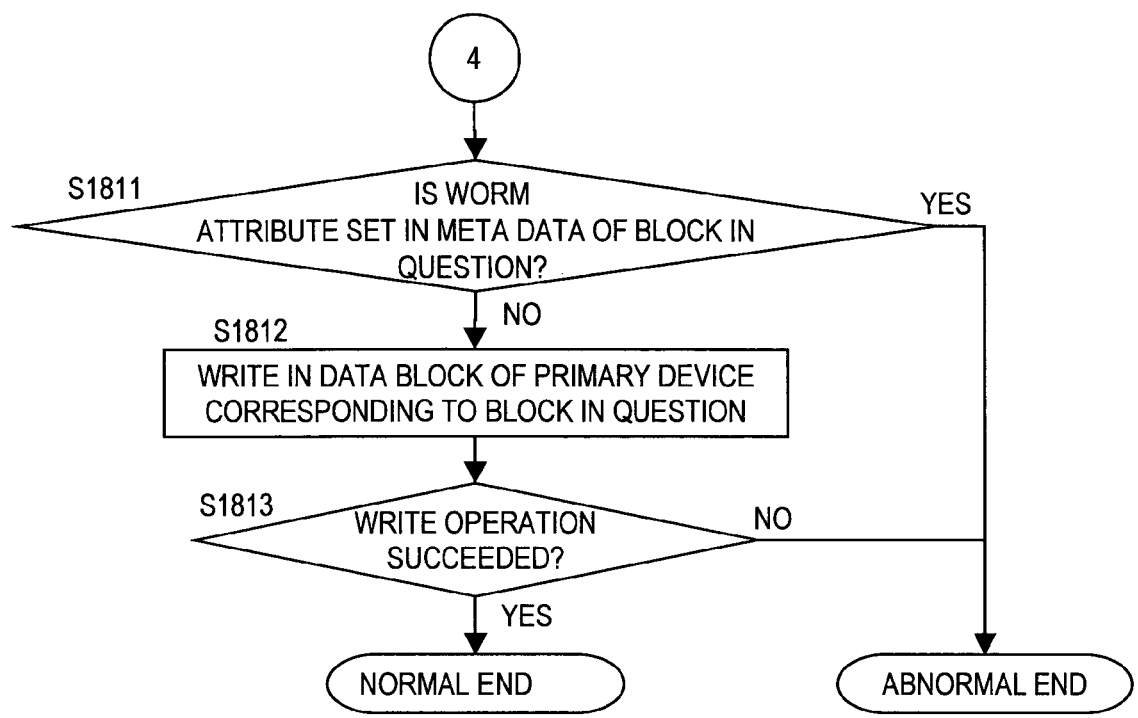
FIG. 18B is a flow chart for processing by the I/O process unit.

FIGS. 18A and 18B are flow charts for processing by the I/O process unit 3023.

The I/O process unit 3023 of the storage system 30 waits for I/O from the file server 20. Receiving I/O from the file server 20, the I/O process unit 3023 starts this processing.

The I/O process unit 3023 determines what I/O is received.

The I/O process unit 3023 first judges whether the received I/O is WORM control I/O or not (S1801). When the received I/O is judged as WORM control I/O, the processing is taken over by the WORM process unit 3021, which then proceeds to execute WORM processing of FIG. 19.

The I/O process unit 3023 next judges whether the received I/O is volume replication control I/O or not (S1802). When the received I/O is judged as volume replication control I/O, the processing is taken over by the volume replication process unit 3022, which then proceeds to execute volume replication processing of FIG. 20.

The I/O process unit 3023 next judges whether the received I/O is a read request, a write request, or other requests (S1803).

When the received I/O is judged as a read request, the processing moves to a step S1805. When the received I/O is judged as a write request, the processing moves to a step S1811 of FIG. 18B.

When the received I/O is judged as a request that is neither a read request nor a write request, processing requested by the received I/O is executed (S1804).

In the step S1805, the I/O process unit 3023 consults meta data for data in a block designated in the read request, and judges whether failure information is set to this meta data or not (S1805). When it is judged that the meta data has failure information set thereto, the processing moves to a step S1807 whereas the processing moves to a step S1806 when it is judged that no failure information is set.

In the step S1806, the data in the block designated by the read request is read out of the primary device, and is sent to the server that has made the request. In the step S1807, on the other hand, the data in the block designated by the read request is read out of the secondary device, and is sent to the server that has made the request.

In short, the data is read out of the primary device when no failure information is set to the block designated by the read request whereas the data is read out of the secondary device when failure information is set to the block designated by the read request.

The I/O process unit 3023 next judges whether this read processing has succeeded or not (S1808). When the read processing has succeeded, the input/output processing ends normally. When the read processing has failed, the input/output processing is ended abnormally.

On the other hand, when it is judged in the step S1804 that the received I/O is a write request, the processing moves to the step S1811 of FIG. 18B, where meta data for the block designated by the write request is consulted to judge whether a WORM attribute is set to the meta data.

When it is judged that the meta data has a WORM attribute set thereto, data cannot be written in this block and therefore the processing is ended abnormally.

When it is judged that no WORM attribute is set to the meta data, the write data is written in the block of the primary device that is designated by the write request (S1812).

The I/O process unit 3023 next judges whether this write processing has succeeded or not (S1813). When the write processing has succeeded, the input/output processing ends normally. When the write processing has failed, the input/output processing is ended abnormally.

Through the above processing, the input/output processing of the storage system 30 is completed.

What deserves special attention here is that, in the steps S1805 to 1807, when there is failure information set to a block of read data, the data is read out of the secondary device instead of the primary device where data read/write usually takes place.

This is achieved by turning, in the volume pair restoration processing, as will be described later, data in the secondary device effective that is a copy of to-be-restored data in a WORM attribute data block when some failure in the block makes it impossible to restore and failure information informing this fact is set to the block.

Figure 19:
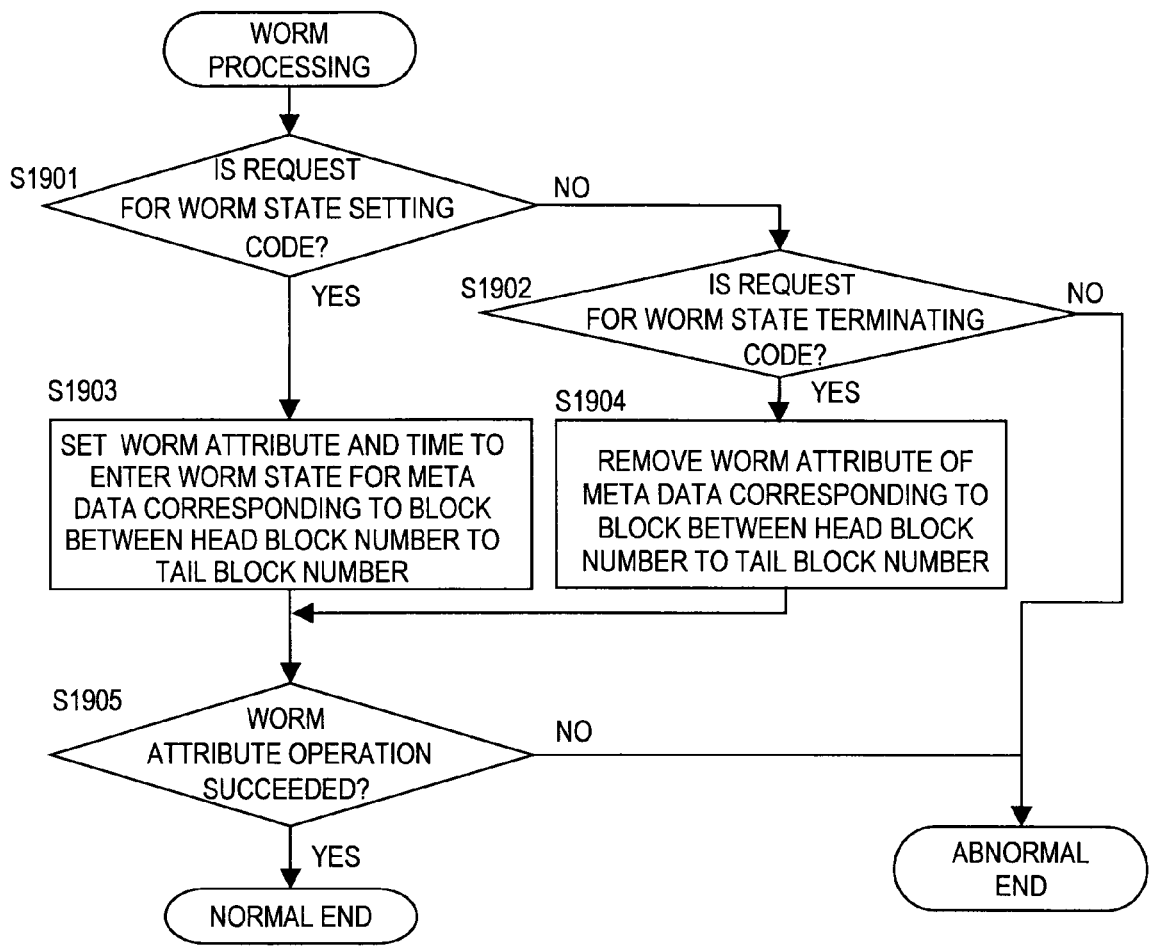
FIG. 19 is a flow chart for WORM processing.

FIG. 19 is a flow chart for the WORM processing executed by the WORM process unit 3021.

In the case where received I/O is judged as WORM control I/O in the step S1801 of the input/output processing of FIG.

18A, the processing is taken over by the WORM process unit 3021, which proceeds to execute the processing shown in this flow chart.

The WORM process unit 3021 first consults the mode parameter of the WORM control I/O to see what request code is set in the mode parameter.

The WORM process unit 3021 then judges whether the request code is a WORM state setting code or not (S1901). When the request code is judged as a code other than the WORM state setting code, the WORM process unit 3021 judges whether the request code is a WORM state terminating code or not (S1902).

In the case where the request code is judged as a WORM state setting code, the processing moves to a step S1903. In the step S1903, the WORM process unit 3021 consults the WORM control mode parameter to obtain a head block number and a tail block number which are stored in the mode parameter. A WORM attribute is set to every meta data that is associated with any block number between the obtained head block number and tail block number, and the current time is set as the time-to-enter-WORM-state 4022 of every such meta data.

When the request code is judged as a WORM state terminating code, the processing moves to a step S1904. In the step S1904, the WORM process unit 3021 consults the WORM control mode parameter to obtain a head block number and a tail block number which are stored in the mode parameter. The set WORM attribute is removed from every meta data that is associated with any block number between the obtained head block number and tail block number.

After the processing of the step S1903 or S1904, the WORM process unit 3021 judges whether the processing of the step S1903 or S1904 has succeeded or not (S1905). When the processing has succeeded, the WORM processing is ended normally. When the processing has failed, the WORM processing is ended abnormally.

In the case where it is judged in the step S1902 that the request code is neither a WORM state setting code nor a WORM state terminating code, an error message is sent to the terminal 10 that has made the request, and the processing is ended abnormally.

Through the above processing, the WORM processing is completed.

FIGS. 20A to 20D are flow charts for the volume replication processing executed by the volume replication process unit 3022.

In the case where received I/O is judged as volume replication control I/O in the step S1802 of the input/output processing of FIG. 18A, the processing is taken over by the volume replication process unit 3022, which proceeds to execute the processing shown in these flow charts.

The volume replication process unit 3022 first consults the mode parameter of the volume replication control I/O to see what request code is set in the mode parameter.

The volume replication process unit 3022 then identifies the set request code.

When the request code is judged as a pair setting code, the processing moves to a step S2005 (S2001).

Figure 20A:
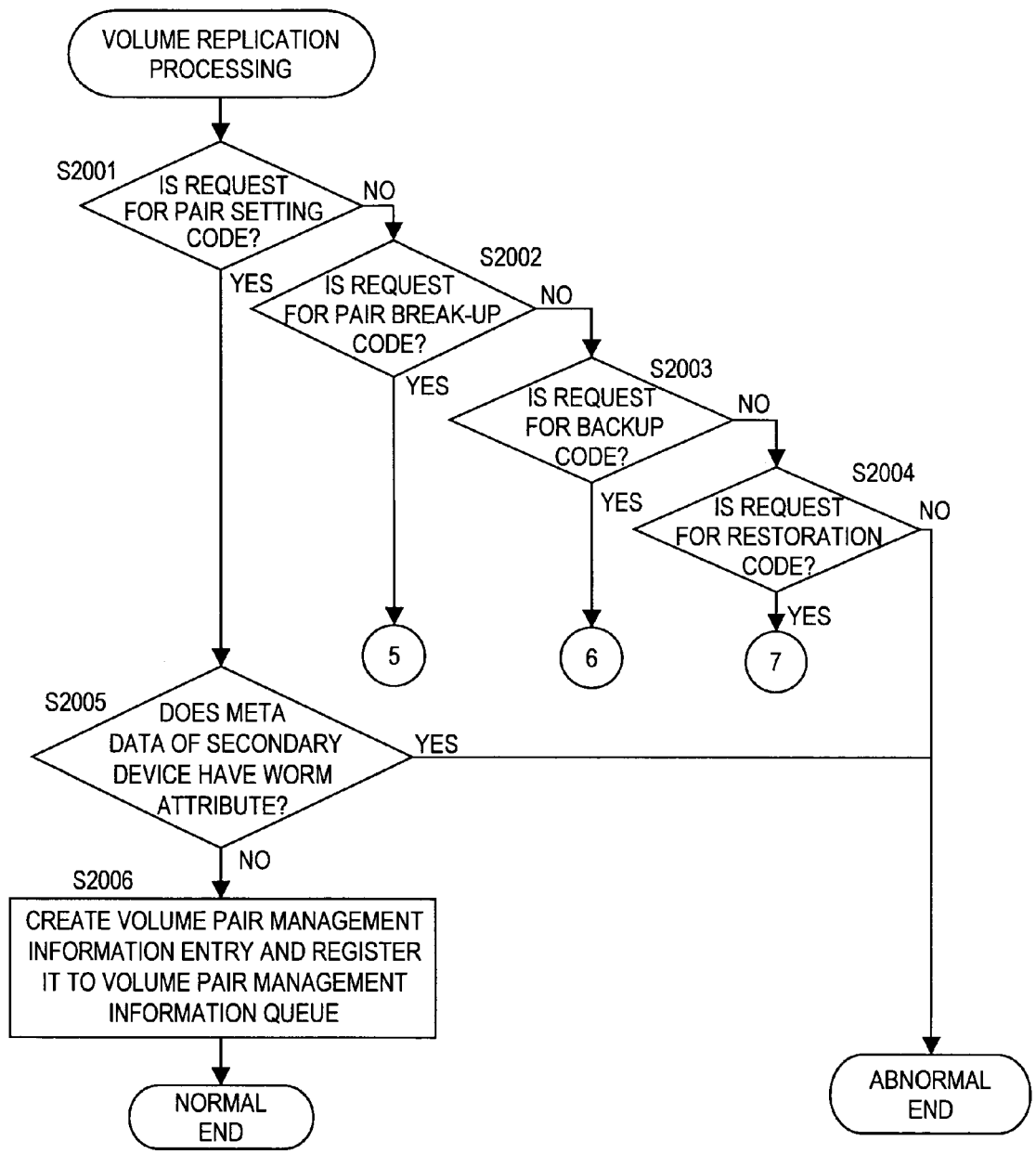
FIG. 20A is a flow chart for volume replication processing.
Figure 20B:
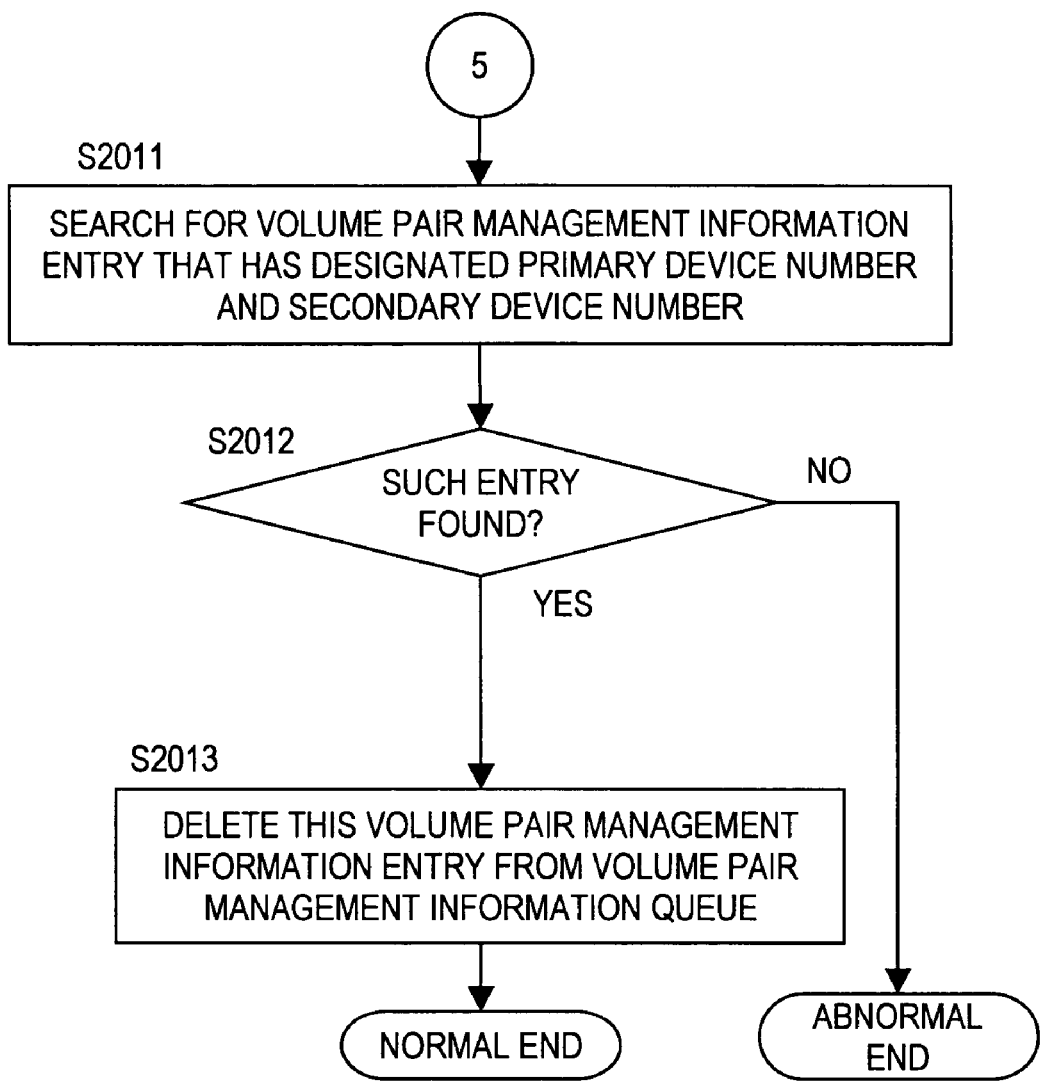
FIG. 20B is a flow chart for volume replication processing.

When the request code is judged as a pair break-up code, the processing moves to a step S2011 of FIG. 20B (S2002).

Figure 20C:
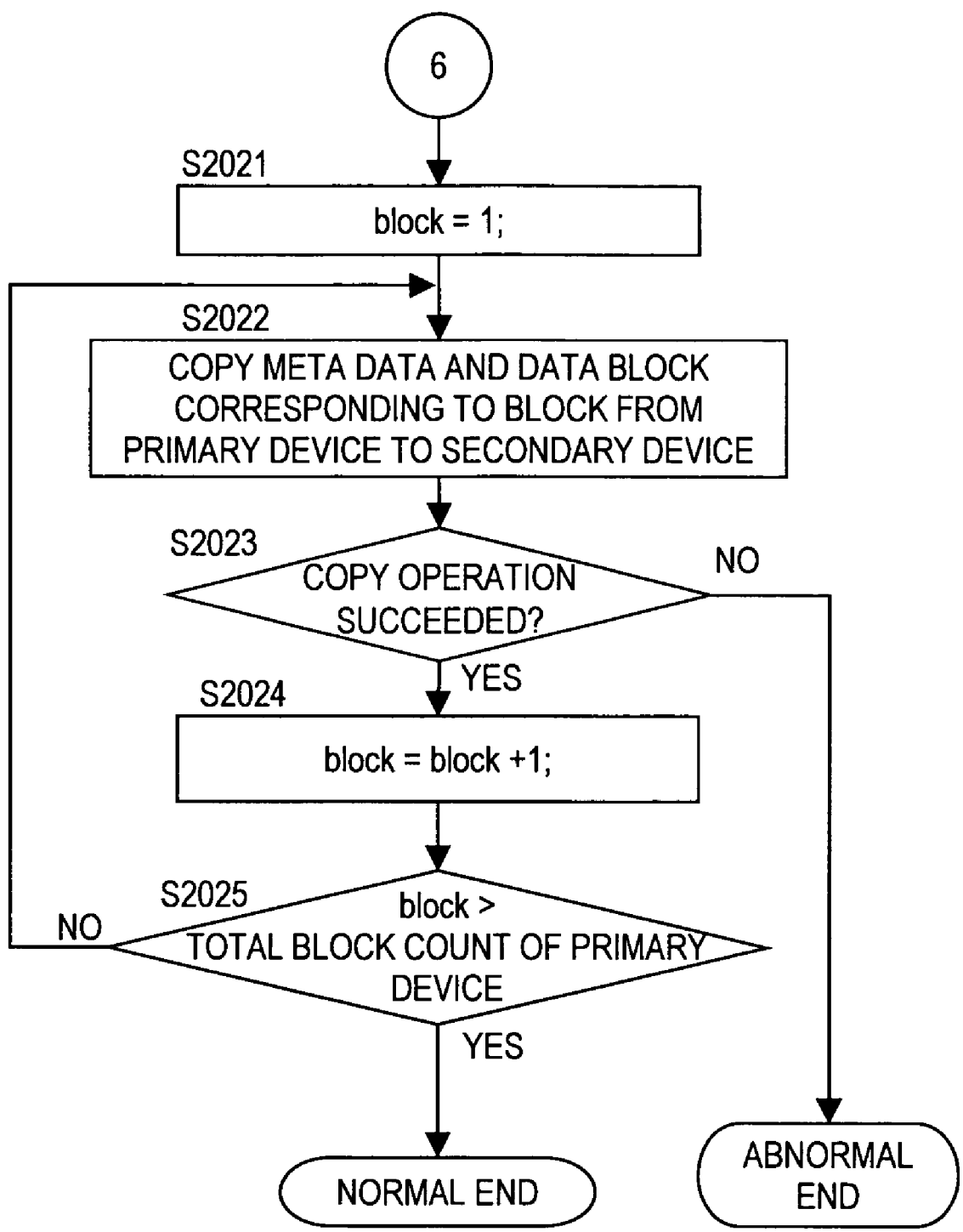
FIG. 20C is a flow chart for volume replication processing.

When the request code is judged as a backup code, the processing moves to a step S2021 of FIG. 20C (S2003).

Figure 20D:
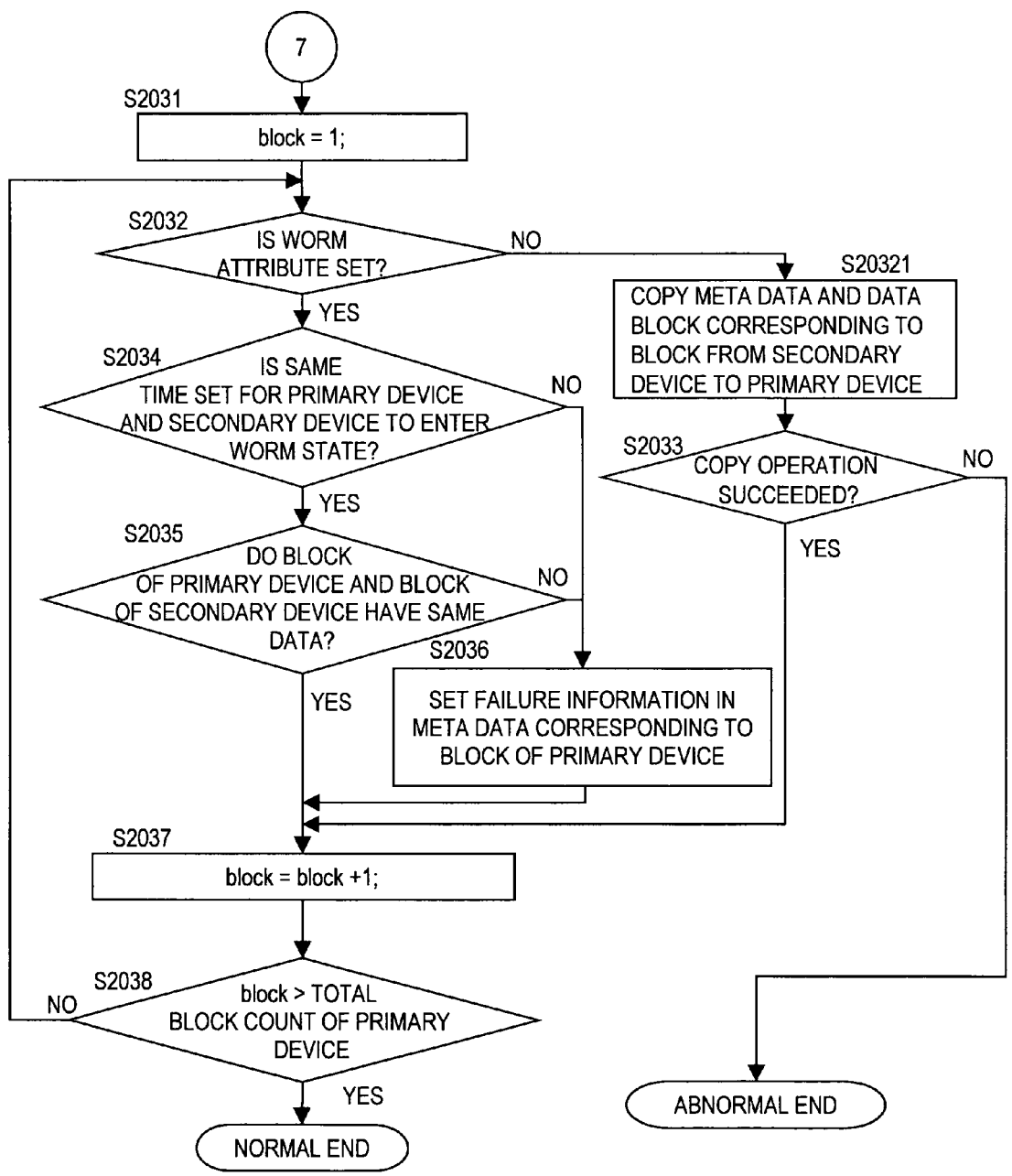
FIG. 20D is a flow chart for volume replication processing.

When the request code is judged as a restoration code, the processing moves to a step S2031 of FIG. 20D (S2004).

When it is judged that the request code is none of the pair setting code, the pair break-up code and the restoration code, the processing is ended abnormally.

In the step S2005, every meta data for a secondary device designated by the request is checked to judge whether or not there is at least one meta data to which a WORM attribute is set.

When there is meta data for a secondary device to which a WORM attribute is set, processing that causes this block to change is unexecutable, and the volume replication process unit 3022 thus judges that setting a pair is not possible. Accordingly, an error message is sent to the terminal 10 that has made the request and the processing is ended abnormally.

When it is judged that there is no meta data for a secondary device to which a WORM attribute is set, the processing moves to a step S2006. In the step S2006, a volume pair management information entry is created in the volume pair management information, and the created entry is registered to a queue. The processing is then ended.

When the request code is judged as a pair break-up code in the step S2002 of FIG. 20A, the processing moves to the step S2011 of FIG. 20B. In the step S2011, the volume replication process unit 3022 searches for a volume pair management information entry that has the designated primary device number and secondary device number. From the result of the search, whether this entry is found or not is judged (S2012).

When there is no such entry, it means that the designated pair does not exist, and the processing is therefore ended abnormally.

When it is judged that there is such entry, this volume pair management information entry is deleted from the queue in the volume pair management information (S2013), and the processing is ended.

When the request code is judged as a backup code in the step S2003 of FIG. 20A, the processing moves to the step S2021 of FIG. 20C.

In the step S2021, a variable "block" is substituted by 1. Then meta data and a data block at a block position in the primary device that is indicated by the variable block are copied (S2022).

The volume replication process unit 3022 next judges whether this copy processing has succeeded or not (S2023). When it is judged that the copy processing has failed, the backup processing is ended abnormally.

When it is judged that the copy processing has succeeded, the variable block is added by 1 (S2024). The volume replication process unit 3022 then judges whether the value of the variable block exceeds the total block count of the primary device or not (S2025).

In the case where the value of the variable block is equal to or smaller than the total block count of the primary device, the volume replication process unit 3022 returns to the step S2022 to repeat the processing. In the case where the value of the variable block exceeds the total block count of the primary device, it means that every data block of the primary device has been copied, and the processing is ended.

When the request code is judged as a restoration code in the step S2004 of FIG. 20A, the processing moves to the step S2031 of FIG. 20D.

In the step S2031, the variable block is substituted by 1. Then meta data at a block position in the primary device that is indicated by the variable block is checked to judge whether or not a WORM attribute is set to this meta data (S2032).

When this meta data is judged to have a WORM attribute set thereto, the processing moves to a step S2034. When it is judged that a WORM attribute is not set to the meta data, the processing moves to a step S20321.

In the step S20321, meta data and a data block at a block position that is indicated by the variable block are copied from the primary device to the secondary device. Then the volume replication process unit 3022 judges whether this copy processing has succeeded or not (S2033). When it is judged that the copy processing has failed, the restoration processing is ended abnormally. When it is judged that the copy processing has succeeded, the restoration processing moves to a step S2037.

In the step S2034, the volume replication process unit 3022 first judges whether or not the time-to-enter-WORM-state 4022 in meta data at a block position in the primary device that is indicated by the variable block coincides with the time-to-enter-WORM-state 4022 of meta data at the corresponding position in the secondary device.

When it is judged that the time-to-enter-WORM-state 4022 in the primary device does not coincide with the time-to-enter-WORM-state 4022 in the secondary device, there is a possibility that the meta data, or data block, at this block position is experiencing some trouble, or a data update has been made. Therefore, the processing moves to a step S2036, where failure information is set to the meta data of the primary device, and then to the step S2037.

The volume replication process unit 3022 next judges whether or not data at the block position in the primary device that is indicated by the variable block coincides with data at the corresponding block position in the secondary device (S2035).

When it is judged that the data in the primary device and the data in the secondary device do not coincide, there is a possibility that the data block at this block position is experiencing some trouble, or a data update has been made. Therefore, the processing moves to the step S2036, where failure information is set to the meta data of the primary device, and then to the step S2037.

In the step S2037, the variable block is added by 1. The volume replication process unit 3022 then judges whether the value of the variable block exceeds the total block count of the primary device or not (S2038).

In the case where the value of the variable block is equal to or smaller than the total block count of the primary device, the volume replication process unit 3022 returns to the step S2032 to repeat the processing. In the case where the value of the variable block exceeds the total block count of the primary device, it means that every data block of the primary device has been copied, and the processing is ended.

Through the above processing, the input/output processing of the storage system 30 is completed.

What deserves special attention here is that, in the processing to meet a restoration request, data in a block to which a WORM attribute is set is not restored, in other words, copying of this data from the secondary device to the primary device is not executed. This is because a block to which a WORM attribute is set cannot be changed until its WORM state period expires.

Figure 21A:
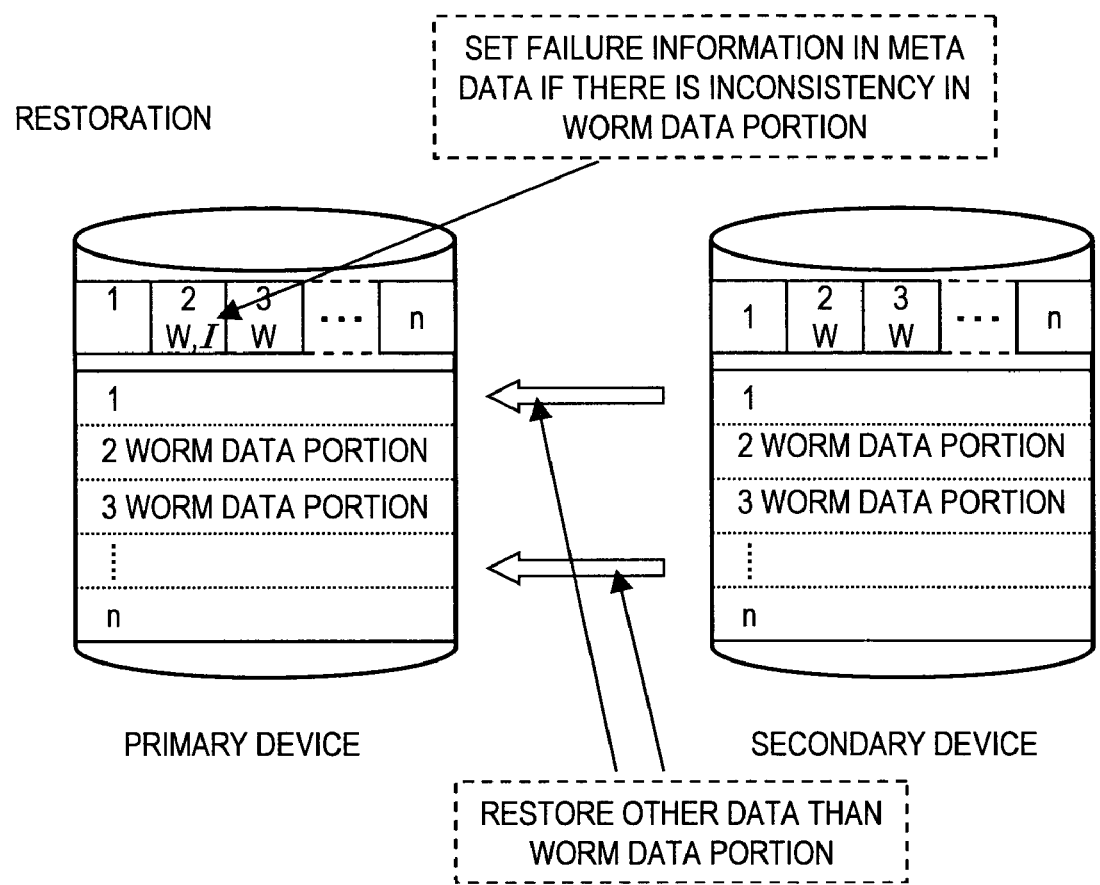
FIG. 21A is an explanatory diagram of restoration processing.
Figure 21B:
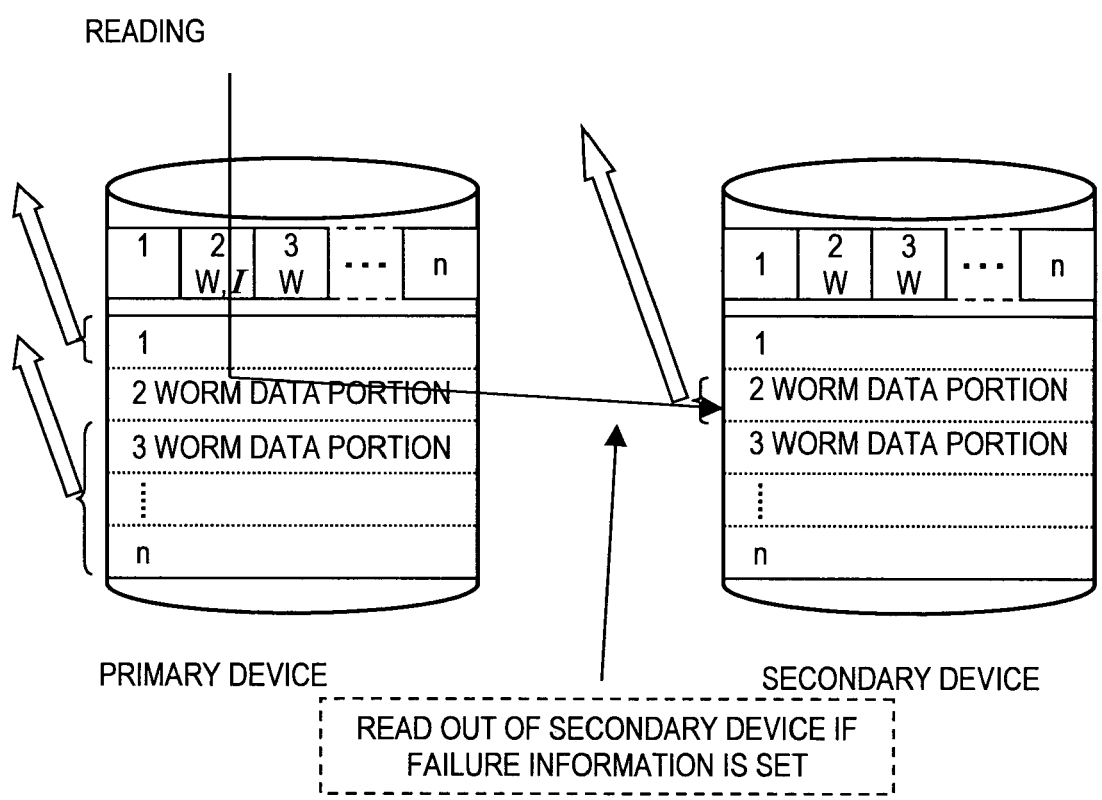
FIG. 21B is an explanatory diagram of processing in reading.

FIGS. 21A and 21B are explanatory diagram of the restoration processing and the processing in reading.

In FIG. 21A, if it is found in the restoration processing that the time-to-enter-WORM-state 4022 of the primary device does not coincide with the time-to-enter-WORM-state 4022 of the secondary device (S2034 of FIG. 20D), or that there is data inconsistency between the primary device and the secondary device (S2035 of FIG. 20D), failure information is set to meta data at this block position in the primary device (S2036 of FIG. 20D). Failure information is represented by I in FIGS. 21A and 21B.

In the case where a read request to read data at this data block position in the primary device is received after the restoration processing (S1803 of FIG. 18A), it is judged whether or not failure information is set to meta data at this block position in FIG. 21B (S1804 of FIG. 18A). When failure information is not set to the meta data, data is read out of this block in the primary device as is the norm (S1806 of FIG. 18A). On the other hand, when failure information is not set to the meta data, data is read out of the corresponding block in the secondary device (S1807 of FIG. 18A).

As has been described, the first embodiment of this invention makes it possible to perform restoration processing on a volume that forms a copy pair with another volume and contains WORM data. When there is WORM data inconsistency between the primary device and the secondary device, in particular, a request to read the data is fulfilled by reading a copy of the data out of the secondary device.

While with prior art a volume containing WORM data cannot update the WORM data until its WORM state period expires and therefore is not reusable, the first embodiment of this invention makes continuous use of this volume possible by utilizing a copy of the data in the secondary volume. However, it is desirable to replace a disk drive with new one if the disk drive contains a volume where a failure has occurred.

With the file-level WORM function, a data portion of a file can be set to a WORM state but a file system management portion is not protected against writing. Therefore, if the file system management portion is destroyed by any chance, merely correcting it makes the file's recovery possible without changing the data block portion.

A second embodiment will be described next.

Figure 22:
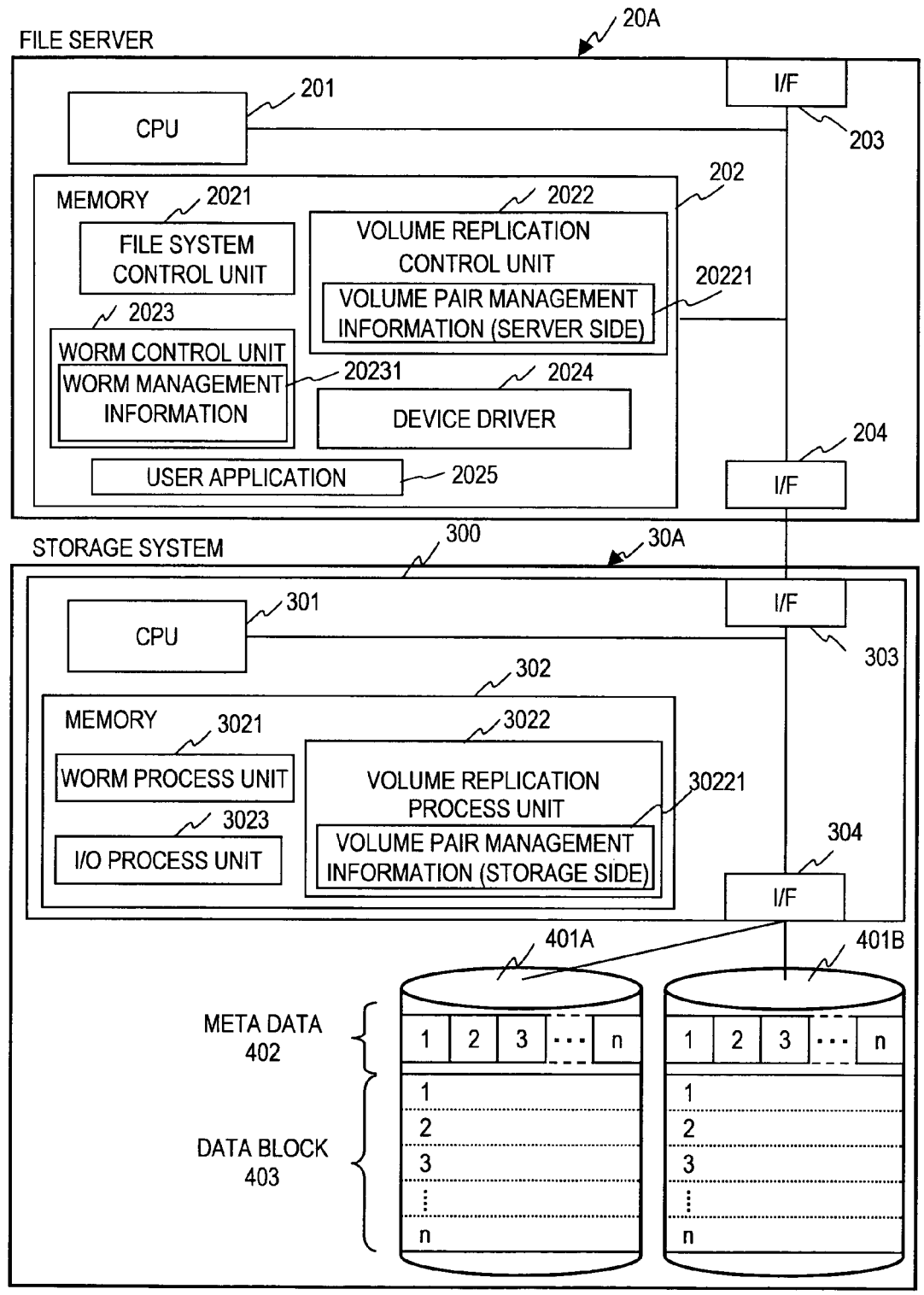
FIG. 22 is a block diagram of a configuration of a storage system according to a second embodiment of this invention.

FIG. 22 is a block diagram of the configuration of a storage system according to the second embodiment of this invention.

Components of the storage system in the second embodiment have different configurations from those in the first embodiment.

A server 20A of the second embodiment has mostly the same configuration as the file server 20 of the first embodiment, and a difference is that the server 20A has a user application 2025 in the memory 202. This enables an administrator or the like who operates the server 20A to execute such processing as read/write of data in the storage system 30, setting volume replication, and setting WORM settings via the server 20A.

The storage system 30A is obtained by combining the above-described storage system 30 and disk drive 40 into one. The storage system 30A has a controller 300, which receives an I/O request from the server 30A to perform processing on the volumes 401A and 401B of the disk drive according to the received I/O request.

Processing and operation of the storage system of the second embodiment are the same as in the first embodiment, and therefore descriptions thereof are omitted.

As the second embodiment shows, this invention is applicable to a storage system that employs a network attached storage (NAS) and to a storage system that employs a storage area network (SAN) alike.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising a disk drive for storing data and a control unit connected to the disk drive for controlling data read/write from/to volumes set in the disk drive, wherein the control unit comprises a processor and a memory, the memory storing a program for controlling data read/write from/to the volumes and program for controlling copying and restoring data between the volumes, wherein the volumes include a first volume and a second volume, the first volume storing data that can be copied to the second volume, and wherein, after the copying is finished, the control unit consults a first meta data associated with data stored in a first block of the first volume, consults, in a case where the consulted first meta data including information indicating that the data stored in the first block of the first volume is prohibited from being updated for a given period, a meta data for a block that follows the first block of the first volume, and restores, in a case where the consulted first meta data does not include information indicating that the data stored in the first block of the first volume is prohibited from being updated for a given period, data stored in the second volume into the first volume by copying data stored in a second block, which is associated with the first block of the first volume, and is located in the second volume, to the first block of the first volume;

wherein the control unit compares data stored in the first block of the first volume with data stored in the second block of the second volume, and sets, in a case where the data stored in the first block of the first volume does not coincide with the data stored in the second block of the second volume, information indicating of a failure to the first meta data.

2. The storage system according to claim 1, wherein the control unit consults the first meta data, consults, in a case where the consulted first meta data includes information indicating that the data stored in the first block of the first volume is prohibited from being updated for a given period, a second meta data for the second block, which is associated with the first block of the first volume, and is located in the second volume, and sets, in a case where a time at which the information indicating that an update is prohibited for a given period is set to the first meta data does not coincide with a time at which the information indicating that an update is prohibited for a given period is set to the second meta data, information indicating of a failure to the first meta data.

3. The storage system according to claim 1, wherein the control unit compares a first data stored in the first block of the first volume with a second data stored in the second block of the second volume, and sets, in a case where the first data does not coincide with the second data, information indicating of a failure to the first meta data.

4. A storage system comprising a disk drive for storing data and a control unit connected to the disk drive, for controlling data read/write from/to volumes set in the disk drive wherein the volumes include a first volume and a second volume, the first volume storing data that can be copied to the second volume, and wherein, after the copying is finished, the control unit consults, in a case where a request to read data from the first volume is received, a first meta data associate with data stored in a first block of the first volume designated by the read request, reads, in a case where information indicating of a failure is set to the consulted first meta data, a second data from a second block, which is associated with the first block of the first volume, and is located in the second volume, and reads, in a case where information indicating a failure is not set to the consulted first meta data, a first data from the first block of the first volume designated by the read request.

5. The storage system according to claim 4, wherein, when the control unit restores data stored in the second volume into the first volume, the control unit sets, in a case where the data stored in the first block of the first volume does not coincide with the data stored in the second block, which is associated with the first block of the first volume, and is located in the second volume, information indicating of a failure to the first meta data.

6. The storage system according to claim 5, wherein when the control unit restores data stored in the second volume into the first volume, the control unit consults the first meta data, and set the information indicating of a failure to the first meta data, in a case where the first meta data includes information indicating that the data stored in the first block of the first volume is prohibited from being updated for a given period, and further in a case where a time at which the information indicating that an update is prohibited for a given period is set to the first meta data does not coincide with a time at which the information indicating that an update is prohibited for a given period is set to a second meta data for a second block, which is associated with the first block of the first volume, and is located in the second volume.

7. The storage system according to claim 5, wherein, when the control unit restores data stored in the second volume into the first volume for restoration, the control unit sets the information indicating of a failure to the first meta data, in a case where the first data does not coincide with the second data.

8. A volume restoring method for restoring data of a volume in a storage system, the storage system comprising a disk drive for storing data and a control unit connected to the disk drive, for controlling data read/write from/to volumes set in the disk drive, wherein the volumes include a first volume and a second volume, the first volume storing data that can be copied to the second volume, the volume restoring method comprising the following steps, which are executed after the copying is finished:

a first step of consulting a first meta data associated with data stored in a first block of the first volume;

a second step of judging whether or not the consulted first meta data includes information indicating that the data stored in the first block of the first volume is prohibited from being updated for a given period;

a third step of consulting, in a case where the consulted first meta data includes information indicating that the data stored in the first block of the first volume is prohibited from being updated for a given period, a meta data for a block that allows the first block of the first volume;

a fourth step of restoring, in a case where the consulted first meta data does not include information indicating that the data stored in the first block of the first volume is prohibited from being updated for a given period, data stored in the second volume into the first volume by copying data stored in the second block, which is associated with the first block of the first volume, and is located in the second volume, to the first block of the first volume; and a fifth step of comparing data stored in the first block of the first volume with data stored in the second block of the second volume; and a sixth step of setting, when the data stored in the first block of the first volume does not coincide with the data stored in the second block of the second volume, information indicating of a failure to the first meta data.

9. The volume restoring method according to claim 8, wherein the fifth step includes a step of consulting the first meta data, and wherein the sixth step includes the following steps of:

consulting, in a case where the first meta data includes information indicating that the data stored in the first block of the first volume is prohibited from being updated for a given period, a second meta data for the second block which is associated with the first block of the first volume, and is located second volume; and setting, in a case where a time at which the information indicating that an update is prohibited for a given period is set to the first meta data does not coincide with a time at which the information indicating that an update is prohibited for a given period is set to the second meta data; information indicating of a failure to the first meta data.

10. The volume restoring method according to claim 8, wherein the fifth step includes comparing a first data stored in the first block of the first volume with a second data stored in the second block of the second volume, and wherein the sixth step includes setting, in a case where the first data does not coincide with the second data, information indicating of a failure to the first meta data.

11. A volume restoring method for restoring data of a volume in a storage system, the storage system comprising a disk drive for storing data and a control unit connected to the disk drive, for controlling data read/write from/to volumes set in the disk drive, wherein the volumes includes a first volume and a second volume, the first volume storing data that can be copies to the second volume, and the data access method comprising the following steps, which are executed after the copying is finished:

a seventh step of consulting, in a case where a request to read data from the first volume is received, a first meta data associated with data stored in a first block of the first volume designated by the read request;

an eight step of reading, in a case where information indicating of a failure is set to the consulted first meta data, a second data from a second block, which is associated with the first block of the first volume, and is located in the second volume; and a ninth step of reading, in a case where information indicating of a failure is not set to the consulted first meta data, a first data from the first block of the first volume designated by the read request.

12. The data access method according to claim 11, further comprising:

a tenth step of comparing, when the data stored in the second volume is to be restored into the first volume, a data stored in the first block of the first volume with a data stored in the second block which is associated with the first block of the first volume, and is located in the second volume; and an eleventh step of setting, when the data stored in the first block of the first volume does not coincide with the data stored in the second block of the second volume, information indicating of a failure to the first meta data.

13. The data access method according to claim 12, wherein the tenth step includes a step of consulting the first meta data, and wherein the eleventh step includes:

a step of consulting, in a case where the first meta data includes information indicating that the data stored in the first block of the first volume is prohibited from being updated for a given period, a second meta data for the second block of the second volume; and a step of setting, in a case where a time at which the information indicating that an update is prohibited for a given period is set to the first meta data does not coincide with a time at which the information indicating that an update is prohibited for a given period is set to the second meta data which is associated with the first block of the first volume, and is located in the second volume, information indicating of a failure to the first meta data.

14. The data access method according to claim 12, wherein the tenth step includes comparing a first data stored in the first block of the first volume with a second data stored in the second block of the second volume, and wherein the eleventh step includes setting, in a case where the first data does not coincide with the second data, information indicating of a failure to the first meta data.

\* \* \* \* \*